United States Patent
Waatti

(10) Patent No.: US 9,756,899 B2
(45) Date of Patent: Sep. 12, 2017

(54) ARTICLE OF FOOTWEAR HAVING AN UPPER WITH CONNECTORS FOR ATTACHING TO A SOLE STRUCTURE

(71) Applicant: NIKE, Inc., Beaverton, OR (US)

(72) Inventor: Todd A. Waatti, Battleground, WA (US)

(73) Assignee: NIKE, Inc., Beaverton, OR (US)

(*) Notice: Subject to any disclaimer, the term of this patent is extended or adjusted under 35 U.S.C. 154(b) by 148 days.

(21) Appl. No.: 14/627,231

(22) Filed: Feb. 20, 2015

(65) Prior Publication Data

US 2016/0242503 A1 Aug. 25, 2016

(51) Int. Cl.
| | |
|---|---|
| A43B 13/28 | (2006.01) |
| A43B 23/02 | (2006.01) |
| A43D 95/14 | (2006.01) |
| A43B 3/24 | (2006.01) |
| A43D 8/22 | (2006.01) |
| B33Y 10/00 | (2015.01) |
| B33Y 80/00 | (2015.01) |

(52) U.S. Cl.
CPC .............. *A43B 13/28* (2013.01); *A43B 3/244* (2013.01); *A43B 23/0205* (2013.01); *A43B 23/0215* (2013.01); *A43B 23/0235* (2013.01); *A43B 23/0245* (2013.01); *A43D 8/22* (2013.01); *A43D 95/14* (2013.01); *B33Y 10/00* (2014.12); *B33Y 80/00* (2014.12)

(58) Field of Classification Search
CPC ............ A43B 3/24; A43B 3/244; A43B 3/122
USPC .................................................... 36/100, 101
See application file for complete search history.

(56) References Cited

U.S. PATENT DOCUMENTS

| | | | | |
|---|---|---|---|---|
| 2,368,314 | A | * | 1/1945 | Marx ....................... A43B 3/24 36/101 |
| 3,538,628 | A | | 11/1970 | Einstein, Jr. |
| 4,998,329 | A | * | 3/1991 | Boros .................. A43B 1/0054 24/662 |
| 5,896,684 | A | * | 4/1999 | Lin ........................ A43B 3/103 36/101 |
| 5,991,950 | A | | 11/1999 | Schenkel |
| 6,311,413 | B1 | * | 11/2001 | Chern .................. A43B 13/182 36/100 |
| 6,931,766 | B2 | | 8/2005 | Greene |
| 8,307,570 | B2 | | 11/2012 | Delgatty |

(Continued)

FOREIGN PATENT DOCUMENTS

| | | |
|---|---|---|
| DE | 29808553 U1 | 8/1998 |
| DE | 20108377 U1 | 9/2002 |
| WO | 2016133592 A1 | 8/2016 |

OTHER PUBLICATIONS

Invitation to Pay Additional Fees mailed Apr. 29, 2016 for PCT Application No. PCT/US2015/067910.

(Continued)

*Primary Examiner* — Ted Kavanaugh
(74) *Attorney, Agent, or Firm* — Quinn IP Law

(57) ABSTRACT

An article of footwear includes an upper and a sole structure. The upper includes elongated members extending from a lower peripheral portion that mechanically connect the upper to a sole structure. The sole structure includes several recesses for engaging the elongated members. The upper and/or the elongated members can be printed using a three-dimensional printer.

17 Claims, 19 Drawing Sheets

(56) References Cited

U.S. PATENT DOCUMENTS

| | | | |
|---|---|---|---|
| 2010/0018079 A1* | 1/2010 | Albert | A43B 3/122 36/101 |
| 2011/0214311 A1* | 9/2011 | Stonisch | A43B 3/12 36/101 |
| 2012/0304449 A1 | 12/2012 | Jackson et al. | |
| 2012/0308332 A1 | 12/2012 | Jackson | |
| 2013/0019496 A1 | 1/2013 | Mizrahi-Shapiro | |
| 2013/0055590 A1* | 3/2013 | Mokos | A43B 1/04 36/45 |
| 2013/0152427 A1 | 6/2013 | Gillett | |
| 2013/0212908 A1 | 8/2013 | Hsu | |
| 2014/0020191 A1 | 1/2014 | Jones et al. | |

OTHER PUBLICATIONS

International Search Report and Written Opinion dated Jul. 4, 2016 for PCT Application No. PCT/US2015/067910.

* cited by examiner

ARTICLE OF FOOTWEAR HAVING AN UPPER WITH CONNECTORS FOR ATTACHING TO A SOLE STRUCTURE

BACKGROUND

The present embodiments relate generally to articles of footwear, and in particular to articles of footwear with an upper and sole structure.

Articles of footwear generally include an upper and a sole structure. The upper may be formed from a variety of materials that are stitched (sewn) or adhesively bonded together to form a space or void within the footwear in order to support and secure a foot. The sole assembly is secured to a lower portion of the upper and is generally positioned between the foot and the ground. In many articles of footwear, including athletic footwear styles, the sole assembly often incorporates an insole, a midsole, and an outsole.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Embodiments can include provisions for connecting an upper and a sole structure. In one aspect, an article of footwear includes an upper having a lower peripheral portion, where the upper includes an elongated member extending from the lower peripheral portion. The article of footwear also includes a sole structure having a top surface and an opposing bottom surface, where the top surface is disposed closer to the upper than is the bottom surface. The sole structure including a recess disposed in the top surface. The top surface of the sole structure further includes an interior portion, and also includes an outer peripheral portion disposed outwardly of the interior portion. The recess includes a first end portion associated with the outer peripheral portion of the top surface and the recess includes a second end portion associated with the interior portion of the top surface. The elongated member includes a first end portion and the elongated member includes a second end portion. The first end portion of the elongated member engages the first end portion of the recess and the second end portion of the elongated member engages the second end portion of the recess.

In another aspect, a method of making an article of footwear includes associating an upper of the article of footwear with a printer, where the upper has a lower peripheral portion. The method also includes printing a first end portion of a mechanical connector so that the first end portion of the mechanical connector is coupled with the lower peripheral portion. The method also includes printing a second end portion of the mechanical connector, where the second end portion extends away from the lower peripheral portion. The second end portion is configured to engage a sole structure and fasten the upper to the sole structure.

In another aspect, a method of printing an upper and an elongated member with a printer includes providing the printer capable of printing each of a first polymeric material and a second polymeric material, where the first polymeric material has a density when cured that is less than a density of the second polymeric material when cured. The method also includes printing the upper with the first polymeric material and printing the elongated member with the second polymeric material. The elongated member is configured to mechanically connect the upper to a sole structure.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

Figure 1:
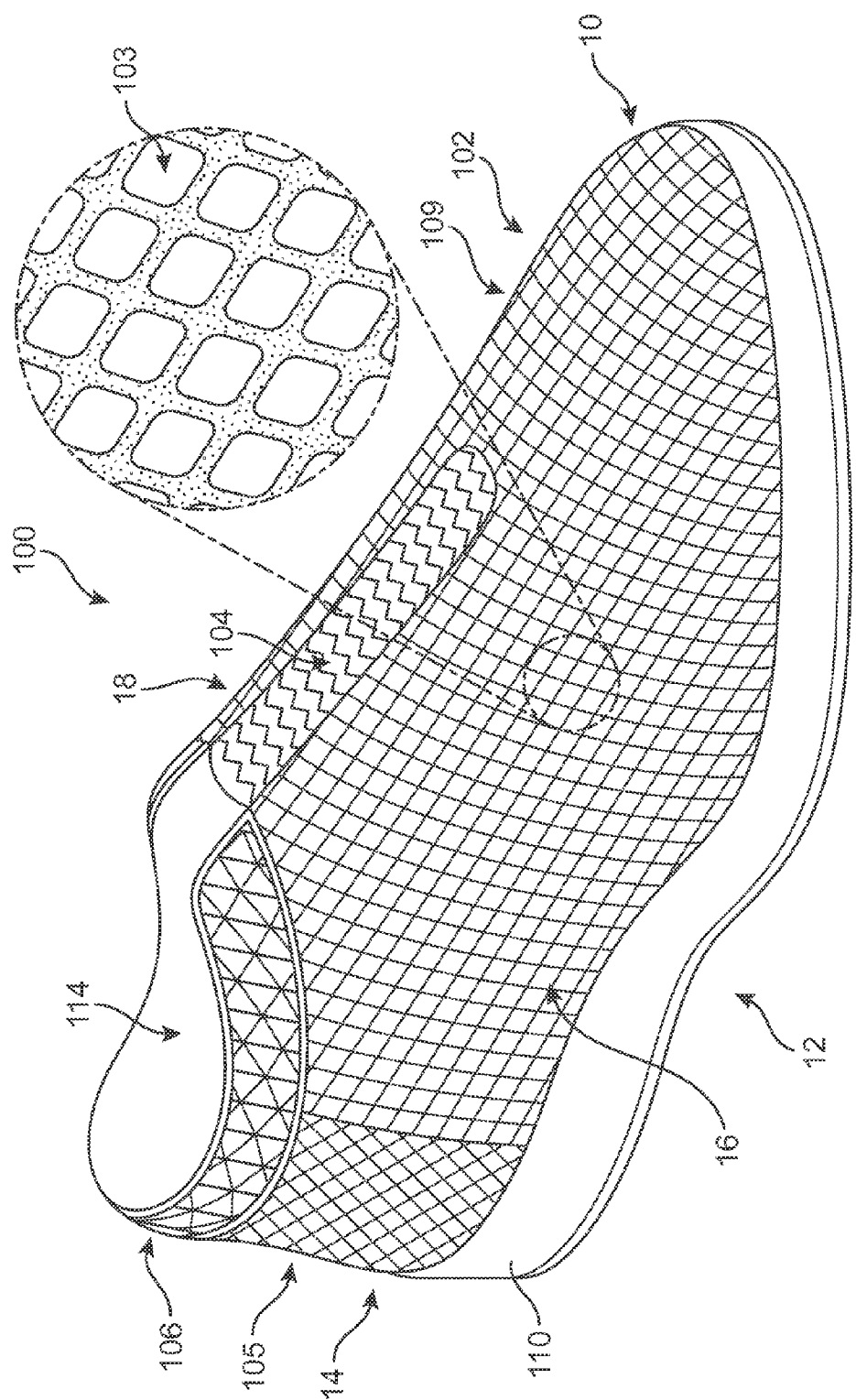
FIG. 1 is an isometric side view of an embodiment of an article of footwear with an upper having various portions.

FIG. 1 illustrates an isometric view of an embodiment of an article of footwear 100, or simply article 100. Although the embodiments throughout this detailed description depict articles configured as athletic articles of footwear, in other embodiments the articles may be configured as various other kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, articles may be configured as various kinds of non-sports related footwear, including, but not limited to: slippers, sandals, high heeled footwear, loafers as well as any other kinds of footwear.

Articles are generally made to fit various sizes of feet. In the embodiments shown, the various articles are configured with the same footwear size. In different embodiments, the articles could be configured with any footwear sizes, including any conventional sizes for footwear known in the art. In some embodiments, an article of footwear may be designed to fit the feet of a child. In other embodiments, an article of footwear may be designed to fit the feet of an adult. Still, in other embodiments, an article of footwear may be designed to fit the feet of a man or a woman.

In some embodiments, an article of footwear may include an upper and a sole structure. In the embodiment shown in FIG. 1, article 100 has upper 102 attached to sole structure 110. Sole structure 110 is secured or fastened to an upper and extends between the foot and the ground when an article is worn. In different embodiments, sole structure 110 may include different components. For example, sole structure 110 may include an outsole, a midsole, and/or an insole. In some cases, one or more of these components may be optional.

Sole structure 110 may provide one or more functions for an article. For example, in some embodiments, sole structure 110 may be configured to provide traction for an article. In addition to providing traction, sole structure 110 may attenuate ground reaction forces when compressed between the foot and the ground during walking, running or other ambulatory activities. The configuration of sole structure 110 may vary significantly in different embodiments to include a variety of conventional or non-conventional structures. In some cases, the configuration of sole structure 110 can be selected according to one or more types of ground surfaces on which sole structure 110 may be used. Examples of ground surfaces include, but are not limited to: natural turf, synthetic turf, dirt, pavement, as well as other surfaces.

Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper. In some embodiments, upper 102 could further include provisions for fastening article 100 to a foot, such as a hook and look system (Velcro, for example) and may include still other provisions found in footwear uppers. Also, some embodiments of upper 102 may include leather, synthetic materials (such as plastic or synthetic leather), mesh, or a combination thereon. In FIG. 1, upper 102 is made from a printable material dispersed by a three-dimensional printer according to a method discussed in further detail below.

Referring to FIG. 1, for purposes of reference, upper 102 may be divided into forefoot portion 10, midfoot portion 12 and heel portion 14. Forefoot portion 10 may be generally associated with the toes and joints connecting the metatarsals with the phalanges. Midfoot portion 12 may be generally associated with the metatarsals of a foot. Likewise, heel portion 14 may be generally associated with the heel of a foot, including the calcaneus bone. In addition, upper 102 may include lateral side 16 and medial side 18. In particular, lateral side 16 and medial side 18 may be opposing sides of article 100. Furthermore, both lateral side 16 and medial side 18 may extend through forefoot portion 10, midfoot portion 12 and heel portion 14. It will be understood that forefoot portion 10, midfoot portion 12 and heel portion 14 are only intended for purposes of description and are not intended to demarcate precise regions of upper 102. Likewise, lateral side 16 and medial side 18 (not shown) are intended to represent generally two sides of upper 102, rather than precisely demarcating upper 102 into two halves. As shown in FIG. 1, article of footwear 100 is intended to be used with a right foot; however, it should be understood that the following description may equally apply to a mirror image of article of footwear 100 that is intended for use with a left foot (not shown).

For consistency and convenience, directional adjectives are employed throughout this detailed description corresponding to the illustrated embodiments. The term "lateral" as used to indicate a direction throughout this detailed description and in the claims refers to a direction extending along a width of a component. For example, the lateral direction of upper 102 may extend between medial side 18 and lateral side 16 of upper 102. Additionally, the term "distal" as used throughout this detailed description and in the claims refers to a direction directed away from a foot, while the term "proximal" as used throughout this detailed description and in the claims refers to a direction directed towards the foot. It will be understood that each of these directional adjectives may be applied to individual components of an article, such as an upper and/or a sole structure.

In some embodiments, upper 102 as shown in FIG. 1 may be made from a three-dimensional printer (discussed in detail later). The term "three-dimensional printer" as used throughout this detailed description and in the claims refers to a printing apparatus capable of printing or disposing a printable material that forms a three-dimensional object. Printable material could be associated with any color such as red, blue, green, yellow, white, black, or a combination thereof. Printable material could also be made of toner material made from acrylic, plastic, ink, or any other polymeric material known in the art for printing a three-dimensional object from a three-dimensional printer.

In different embodiments, upper 102 may be configured with one or more designs in order to achieve a certain look or function. For example, in the embodiment shown in FIG. 1, upper 102 comprises a mesh structure 103 disposed throughout one or more portions of upper 102.

In at least some embodiments, the mesh structure 103 provided for upper 102 can vary throughout different portions of upper 102. For example, the embodiment shown in FIG. 1 is configured with several distinct portions, which may each be characterized by a different mesh configuration. A first portion 109 of upper 102 may extend primarily through forefoot portion 10 and midfoot portion 12. A second portion 105 of upper 102 may primarily extend through heel portion 14. A third portion 106 of upper 102 may primarily extend around opening 114 of upper 102, where opening 114 is configured to receive a foot. As indicated schematically in FIG. 1, each of these portions may have distinct mesh patterns that may vary in mesh size, mesh geometry and/or material properties. As one example, an enlarged view of first portion 109 of upper 102 shows that mesh portion 103 comprises a grid of material surrounding diamond-shaped and/or rectangular openings. It will be understood that the mesh patterns for each distinct portion of upper 102 can be varied to achieve different provisions in different portions of upper 102. Moreover, while the exemplary embodiment depicts a particular arrangement of distinct mesh patterns for different portions of upper 102, other embodiments could include any other configurations of mesh patterns. In at least some embodiments, for example, a majority of upper 102 may be comprised of a single mesh pattern. In still other embodiments, some portions of upper 102 could be comprised of any other non-mesh materials including various textiles, leather goods or other materials known in the art for making uppers.

Upper 102 may further include a tongue portion 104. In some embodiments, tongue portion 104 may be disposed along the throat of upper 102. In at least some embodiments, tongue portion 104 may comprise a portion that is substantially more flexible than adjacent portions of upper 102, which may be comprised of mesh structure 103. It is contemplated that in at least some embodiments, tongue portion 104 may facilitate the expansion of the throat of upper 102 around a foot. In some embodiments, tongue portion 104 may provide tension between opposing sides of upper 102 once a foot has been inserted into upper 102, thereby helping to keep upper 102 fastened around the foot. Tongue portion 104 may also provide cushioning to the top of a foot.

Tongue portion 104 could be made of any material. In some embodiments, for example, tongue portion 104 could be comprised of a stretchable fabric. In other embodiments, tongue portion 104 could have a mesh configuration.

Figure 2:
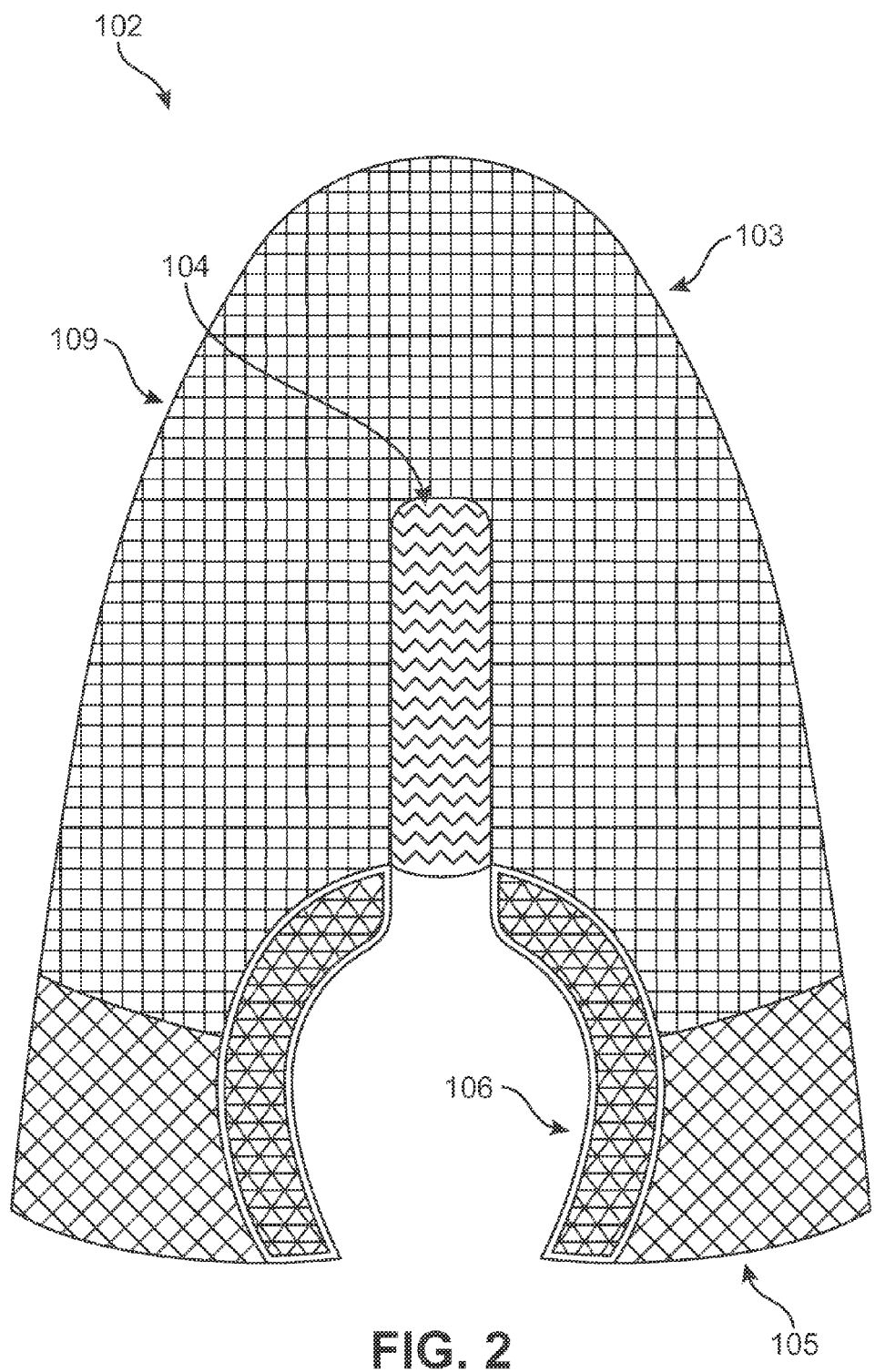
FIG. 2 is a schematic view of the upper shown in FIG. 1.

FIG. 2 illustrates a schematic view of upper 102 in a flattened configuration. In embodiments where upper 102 is formed using a three-dimensional printer, the three-dimensional printer may print, for example, first portion 109, second portion 105 and third portion 106 of upper 102. In some cases, the three-dimensional printer could also be used to print tongue portion 104. However, some portions may be printed and others may be joined to the printed portions at a later time. For example, in some embodiments, tongue portion 104 could be joined with upper 102 after first portion 109, second portion 105 and third portion 106 have been printed.

Figure 3:
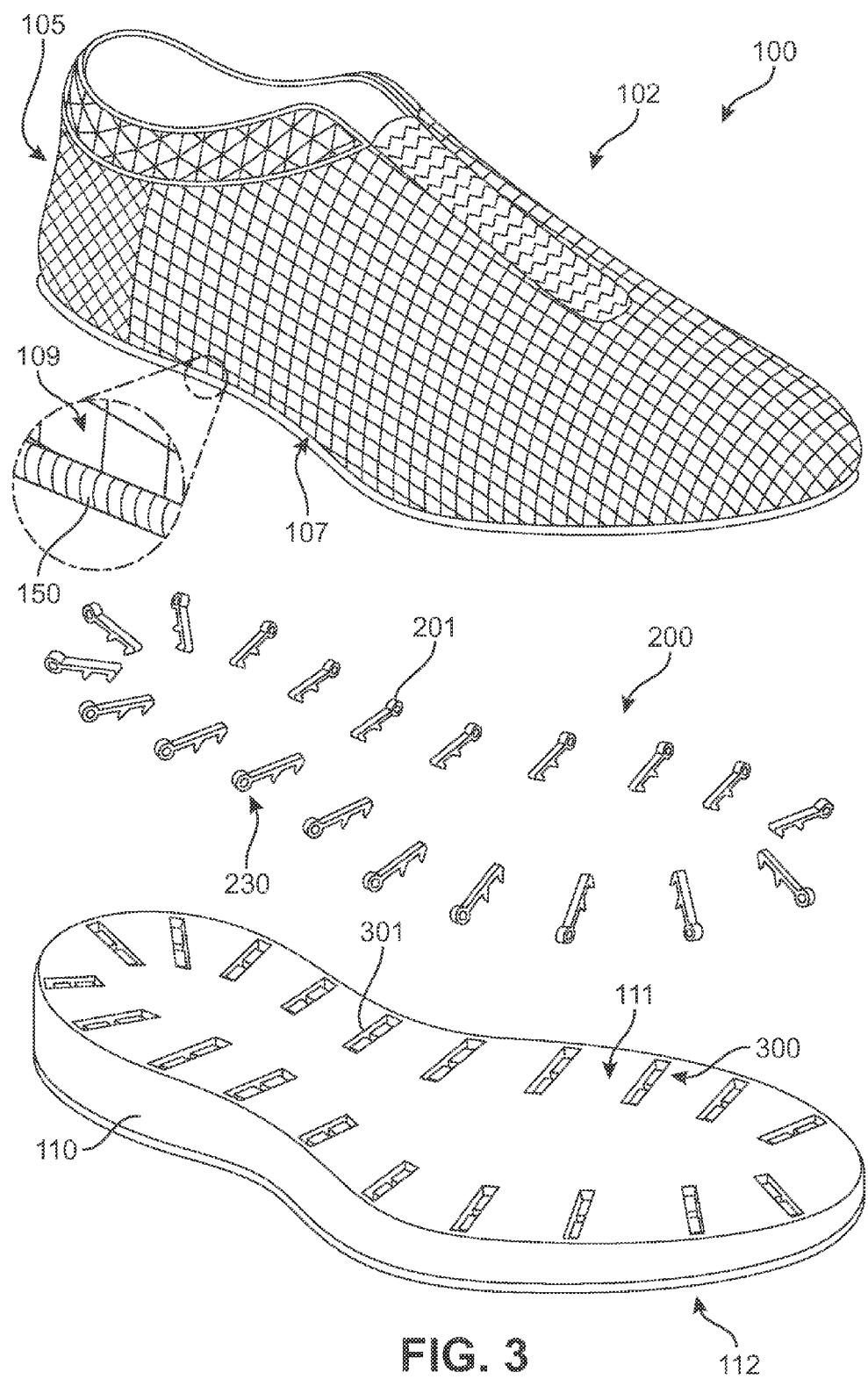
FIG. 3 is an exploded view of the embodiment of the article of footwear in FIG. 1 showing the upper, elongated members, and the sole structure.

Upper 102 may then be formed into a three-dimensional structure, as shown in FIGS. 1 and 3, for example, in order to conform to a traditional upper that is shaped to receive a foot. In other embodiments, upper 102 may be printed as a three-dimensional structure such that immediately after upper 102 is formed, upper 102 is configured to receive a foot. In other words, in at least some embodiments, upper 102 could be printed with a three-dimensional geometry, rather than being printed as a two-dimensional layer.

Embodiments can include provisions to attach an upper to a sole structure without the use of adhesives, stitching, sewing, knitting or use of a strobel. In the embodiments shown in FIG. 3, upper 102 may attach to sole structure 110 by using a plurality of elongated members 200 (also referred to hereafter as simply elongated members 200). In at least some embodiments, elongated members 200 may be mechanical connectors that facilitate the connection of an upper to a sole structure.

FIG. 3 is an exploded view of the embodiment of upper 102 shown in FIG. 1, along with elongated members 200 and sole structure 110. Sole structure 110 includes top surface 111 having a plurality of recesses 300 (also referred to hereafter as simply recesses 300). Sole structure 110 further includes bottom surface 112, which is a surface opposite of top surface 111. Top surface 111 is disposed closer to upper 102 than bottom surface 112. Bottom surface 112 is generally intended to contact a ground surface (not shown). Recesses 300 on top surface 111 are generally configured to receive elongated members 200. For example, first elongated member 201 may be received by first recess 301.

In the embodiment shown in FIG. 3, upper 102 further includes cord element 150. Cord element 150 generally extends along a lower peripheral portion 107 of upper 102. The term "lower peripheral portion" as used throughout this detailed description and in the claims refers to the outer perimeter of upper 102 when upper 102 is laid flat, and refers to the lower perimeter of upper 102 adjacent to sole structure 110 when upper 102 is attached to sole structure 110. Cord element 150 generally has a circular cross section with the diameter of the circular cross section being less than the diameter of apertures 230 of elongated members 200. In other embodiments, cord element 150 could have a square or rectangular cross section, and accordingly, other embodiments of apertures 230 of elongated members 200 could be square or rectangular, respectively.

Elongated members 200 may attach to upper 102 by cord element 150 passing through apertures 230 of elongated members 200. While cord element 150 is used to attach elongated members 200 to upper 102 in the exemplary embodiment, in other embodiments, elongated members 200 may be attached directly onto lower peripheral portion 107 of upper 102. For example, elongated members 200 could be attached directly to first portion 109 and/or second portion 105 of upper 102 at lower peripheral portion 107. Further, in other embodiments, elongated members 200 could be connected to upper 102 at one or more portions above lower peripheral portion 107.

Also, as shown in FIG. 3, elongated members 200 are generally spaced evenly around lower peripheral portion 107 of upper 102. That is, elongated members 200 may be disposed on forefoot 10 portion, midfoot portion 12, and heel portion 14 on both lateral side 16 and the medial side (not shown) of article 100. In other embodiments, elongated members 200 may not be evenly spaced around lower peripheral portion 107 of upper 102. For example, elongated members 200 on forefoot portion 10 could be spaced further apart from one another than elongated members 200 on midfoot portion 12.

Figure 4:
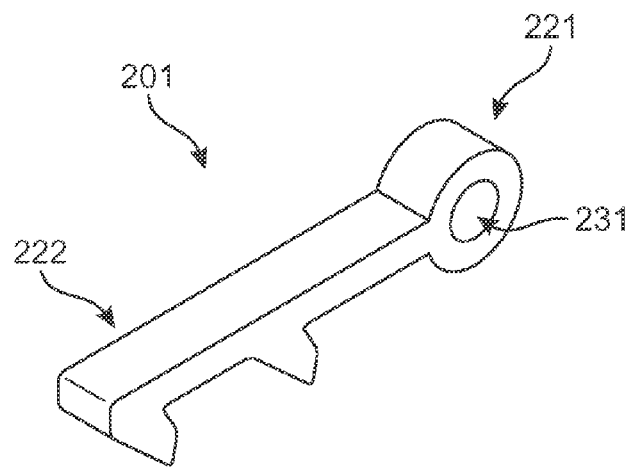
FIGS. 4 and 5 are enlarged views of an embodiment of an elongated member.
Figure 5:
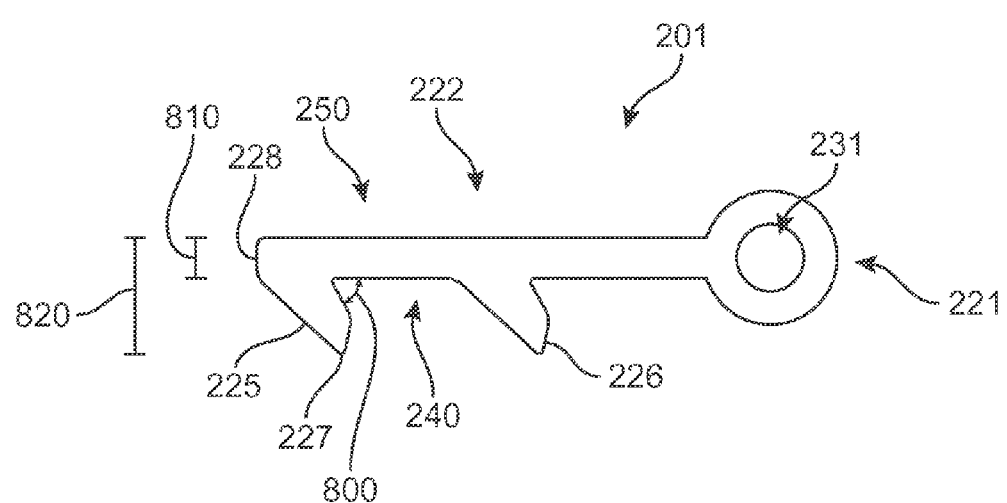
Figure 6:
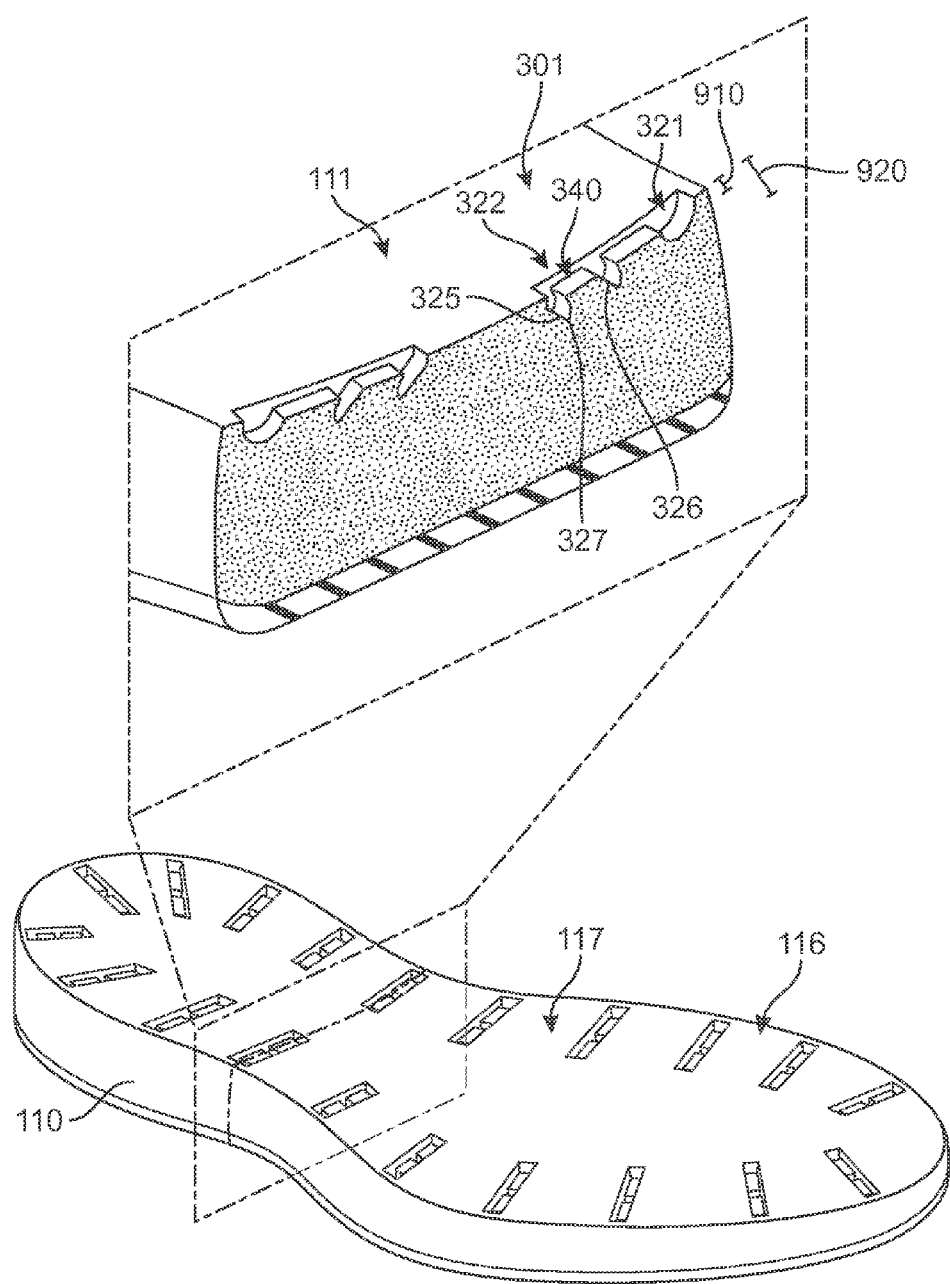
FIG. 6 is an isometric view of the embodiment of the sole structure in FIG. 3, further including a cross sectional view of the sole structure.

FIGS. 4-6 illustrate the relationship between elongated members 200 attached to upper 102 and recesses 300 on sole structure 110. Elongated members 200 include a first elongated member 201. Referring to FIGS. 4 and 5, first elongated member 201 includes first end portion 221 and second end portion 222. First end portion 221 includes first aperture 231. In some embodiments, first end portion 221 has a rounded or ring-like geometry that surrounds first aperture 231. In other embodiments, however, the geometry of first end portion 221 could vary in any other manner.

First aperture 231 may be configured to receive cord element 150 of upper 102. By cord element 150 extending through first aperture 231 of first end portion 221, first elongated member 201 is free to at least partially rotate around cord element 150. This allows for easier alignment between first elongated member 201 and first recess 301 (see FIG. 6).

In some embodiments, the exterior appearance of first end portion 221 may correspond to the shape of first aperture 231. For example in FIG. 4, first aperture 231 is generally round, and accordingly, first end portion 221 is also generally round. In other embodiments, first aperture 231 could be square or rectangular, and accordingly, first end portion 221 of first elongated member 201 and first end portion 321 of first recess 301 could also be square or rectangular, respectively. In other embodiments, the geometry of aperture 231 may not correspond with the geometry of first end portion 221.

As shown in FIG. 5, first elongated member 201 further includes second end portion 222. In order to engage first recess 301 (shown in FIG. 6) of recesses 300 and secure upper 102 to sole structure 110, second end portion 222 may include several protrusions on bottom surface 240 of second end portion 222. In some embodiments, second end portion 222 could include one protrusion. In other embodiments, second end portion 222 could include at least three, four, or five protrusions.

In the exemplary embodiment shown in FIG. 5, second end portion 222 includes first protrusion 225 and second protrusion 226. First protrusion 225 and second protrusion 226 generally extend in a distal direction with respect to bottom surface 240. In other words, first protrusion 225 and second protrusion 226 extend away from bottom surface 240. Although the embodiment shown in FIG. 5 illustrates first protrusion 225 and second protrusion 226 as generally similar, first protrusion 225 and second protrusion 226 may have at least some differences in other embodiments. Also, as shown in FIG. 5, in the exemplary embodiment, first protrusion 225 and second protrusion 226 have a pointed end. For example, first protrusion has first end 227. In other embodiments, first end 227 could be a flat surface. Still, in other embodiments, first end 227 could be a rounded surface.

To better secure or fasten upper 102 to sole structure 110, protrusions of an elongated member may be oriented such that an angle between the protrusions and bottom surface 240 of second end portion 222 is less than 90 degrees. For example in FIG. 5, angle 800 between first protrusion 225 and bottom surface 240 is approximately 45 degrees. In other embodiments, angle 800 between first protrusion 225 and bottom surface 240 may vary in the range of approximately 10 degrees and 80 degrees. Also, in FIG. 5, the angle between second protrusion 226 and bottom surface 240 is generally similar to the angle between first protrusion 225 and bottom surface 240, and may vary according to the same range as described for first protrusion 225. However, in other embodiments, the angle between first protrusion 225 and bottom surface 240 may differ from the angle between second protrusion 226 and bottom surface 240.

Referring to FIGS. 5 and 6, second end portion 222 may have a top surface 250. Top surface 250 is generally a surface disposed on the opposite side of bottom surface 240. Second end portion 222 has first thickness 810 extending between top surface 250 and bottom surface 240. Second end portion 222 further has second thickness 820 extending between top surface 250 and first end 227 of first protrusion 225. First thickness 810 and second thickness 820 may correspond with depths of a recess configured to receive them, as discussed below. Also, FIG. 5 further shows second end portion 222 having tip 228. Tip 228 as shown in FIG. 5 is generally flat. However, in other embodiments, tip 228 could be rounded or pointed.

FIG. 6 shows the embodiment of the sole structure 110 shown in FIG. 3, with a cross sectional view of sole structure 110 showing first recess 301. As shown in the cross section, first recess 301 includes first end portion 321 and second end portion 322. First end portion 321 is generally located on an outer peripheral portion 116 of top surface 111 of sole structure. The term "outer peripheral portion" as used throughout this detailed description and in the claims refers to an area near the outer perimeter of top surface 111 of sole structure 110. It will be understood that outer peripheral portion 116 is only intended for purposes of description and is not intended to demarcate a precise location. Generally, first end portion 321 of first recess 301 has a shape corresponding to first end portion 221 of first elongated member 201. For example, first end portion 321 of first recess 301 is generally round which corresponds to a rounded shape of first end portion 221 of first elongated member 201, as shown in FIGS. 4 and 5. First end portion 321 of first recess 301 is generally configured to receive at least some portion of first end portion 221 of first elongated member 201.

FIG. 6 further shows second end portion 322 of first recess 301. Second end portion 322 of first recess 301 is generally located on an interior portion 117 of top surface 111 of sole structure 110. The term "interior portion" as used throughout this detailed description and in the claims refers to the central area of top surface 111 of sole structure 110, or an area disposed inwardly of outer peripheral portion 116. Generally, second end portion 322 of first recess 301 has a shape corresponding to second end portion 222 of first elongated member 201. For example, as shown in FIG. 6, second end portion 322 of first recess 301 includes first notch 325 and second notch 326. In some embodiments, first notch 325 and second notch 326 generally have a shape corresponding to first protrusion 225 and second protrusion 226 of first elongated member 221, respectively.

Second end portion 322 also includes bottom surface 340. Bottom surface 340 extends between first notch 325 and second notch 326, and also extends between second notch 326 and first end portion 321. The angle (not shown) between first notch 325 of first recess 301 and bottom surface 340 of first recess 301 is configured to be similar to angle 800 between first protrusion 225 and bottom surface 240 of first elongated member 201. Further, the angle (not shown) between second notch 326 of first recess 301 and bottom surface 340 of first recess 301 is generally similar to the angle between second protrusion 226 and bottom surface 340 of first elongated member 201. First notch 325 and second notch 326 are configured to receive first protrusion 225 and second protrusion 226, respectively.

As seen in FIG. 6, second end portion 322 has a first depth 910 extending from bottom surface 340 of second end portion 322 to top surface 111 of sole structure 110, and a second depth 920 extending from first end 327 of first notch 325 to top surface 111 of sole structure 110. Generally, first depth 910 of first recess 301 and second depth 920 of first recess 301 are substantially similar to first thickness 810 of second end portion 222 and second thickness 820 of second end portion 222 (see FIG. 5), respectively. Accordingly, when first elongated member 201 is disposed in first recess 301, second end portion 222 of first elongated member 201 is disposed within second end portion 322 of first recess 301 such that top surface 250 of first elongated member 201 is substantially co-planar, or flush, with top surface 111 of sole structure 110. The term "co-planar" as used in this detailed description and in the claims refers to two or more surfaces disposed on the same two-dimensional plane. In other embodiments, top surface 250 of first elongated member 201 may not be co-planar with respect to top surface 111 of sole structure 110. For example, first thickness 810 could be greater than first depth 910 so that top surface 250 of first elongated member 201 is elevated with respect to top surface 111 of sole structure 110. Alternatively, first depth 910 could be greater than first thickness 810 so that top surface 111 of sole structure 110 is elevated with respect to top surface 250 of first elongated member 201.

Figure 7:
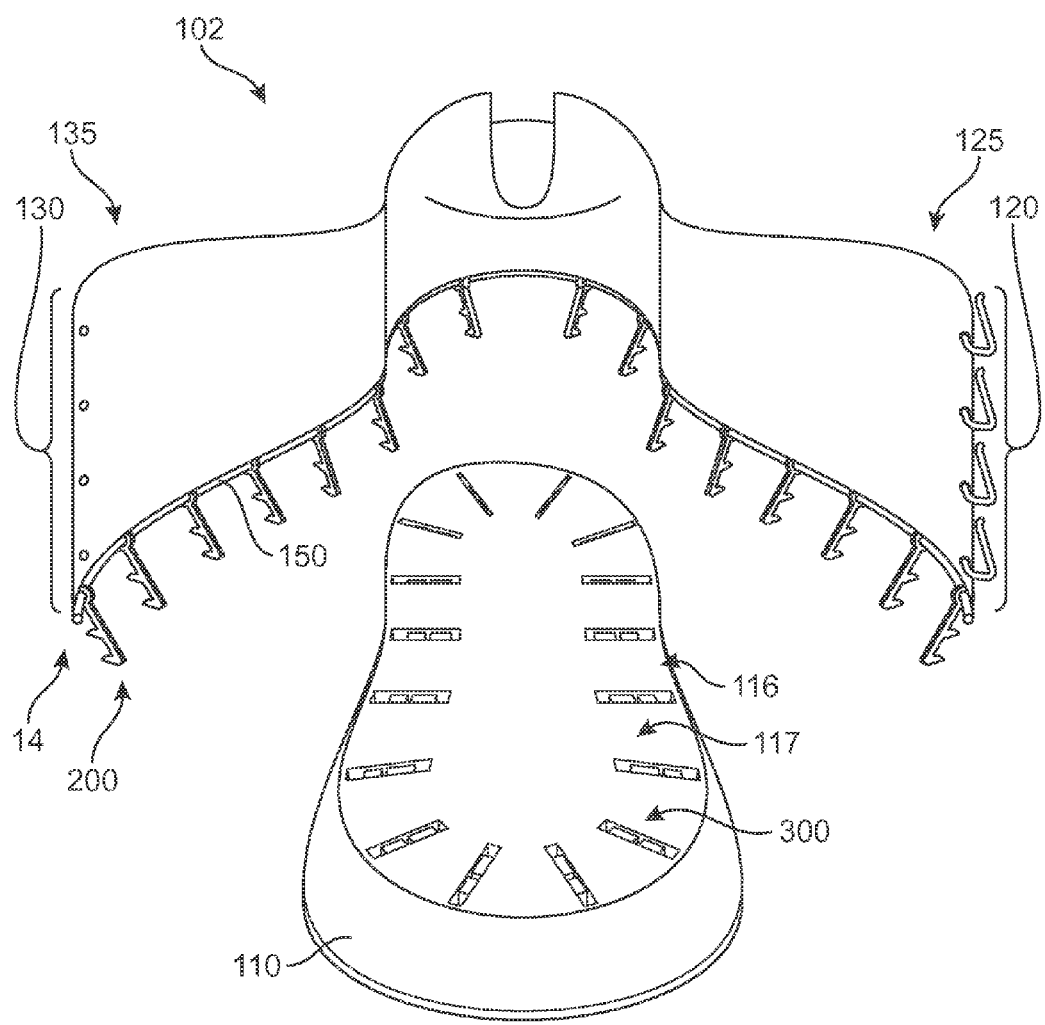
FIGS. 7-10 are schematic views of steps in a method of connecting an upper to a sole structure, according to an embodiment.

FIG. 7-10 illustrate the assembly or connection of upper 102 to sole structure 110 using using elongated members 200. For purposes of illustration, some details of upper 102 in FIGS. 7-10 have been omitted. FIG. 7 shows upper 102 having elongated members 200 attached to upper 102.

In the exemplary embodiment shown in FIG. 7, upper 102 includes heel straps 120 on first end 125 of heel portion 14, and apertures 130 on second end 135 of heel portion 14. Heel straps 120 are generally elongated pieces of material that may be used to fasten heel portion 14. In at least some embodiments, heel straps 120 may be formed by a three-dimensional printing process from a printable material; e.g., a polymeric material. In order to enclose heel portion 14, heel straps 120 engage apertures 130. In other embodiments, heel straps 120 may be disposed on second end 135 of heel portion 14, and apertures 130 may be disposed on first end 125 of heel portion 14.

Figure 8:
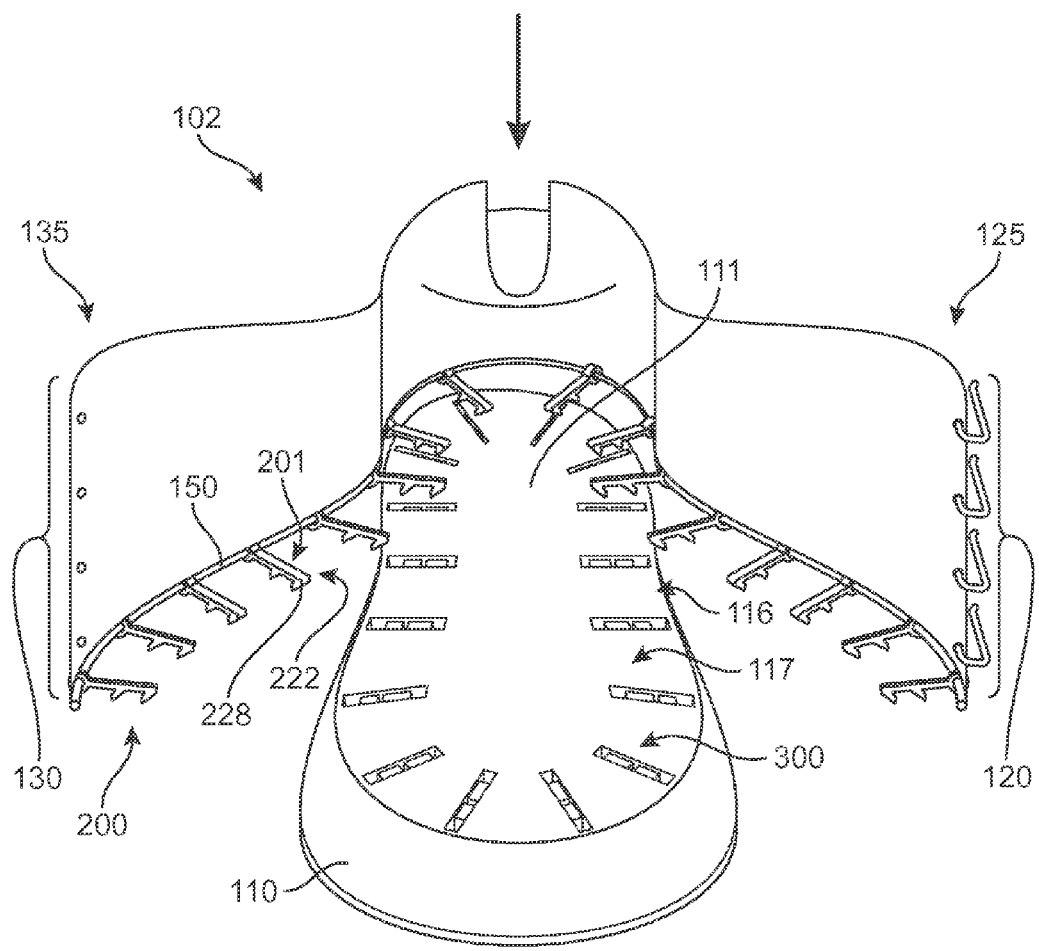

In FIG. 8, upper 102 and elongated members 200 are arranged for assembly with sole structure 110. To align elongated members 200 with corresponding recesses 300, elongated members 200 may oriented so that they extend inwardly from the outer peripheral portion 116 of top surface 111 to the interior portion 117 of top surface 111. For example, tip 228 of second end portion 222 of first elongated member 201 points generally in a direction toward interior portion 117. Because elongated members 200 are rotatably coupled to cord element 150, each elongated member can easily be rotated into a position that aligns the elongated member with a corresponding recess on top surface 111.

Figure 9:
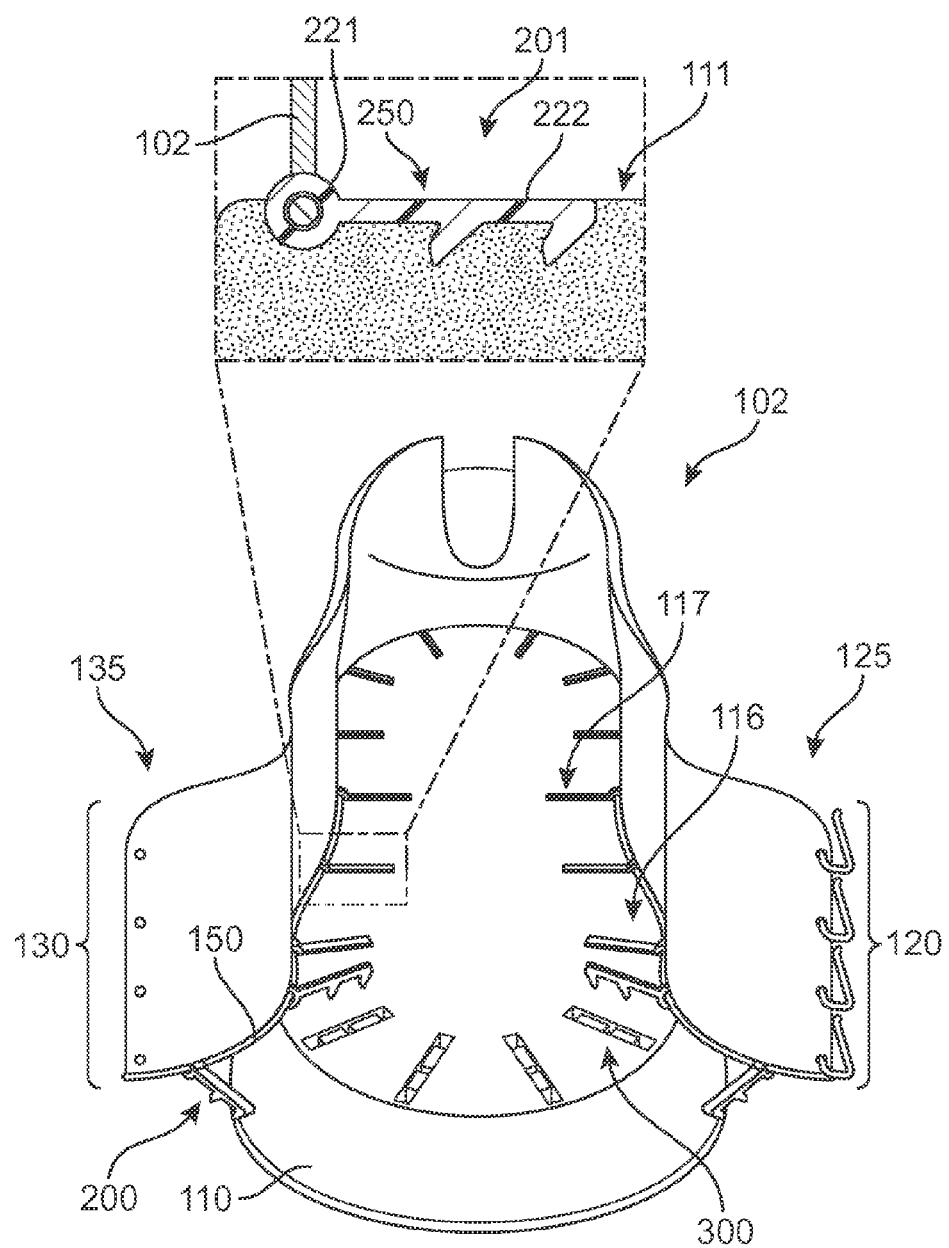

FIG. 9 shows upper 102 partially connected to sole structure 110 via elongated members 200. Once elongated members 200 are engaged with recesses 300, a portion of elongated members 200 are generally co-planar, or flush, with recesses. For example, in FIG. 9, top surface 250 of second end portion 222 of first elongated member 201 is approximately co-planar with top surface 111 of sole structure 110.

In at least some embodiments, the rounded geometry of first end portion 221 of first elongated member 201 may provide a portion of first elongated member 201 that extends outwardly from first recess 301 when first elongated member 201 is inserted into first recess 301. In other words, in some cases, first end portion 221 may not be flush with top surface 111, while second end portion 222 may generally be flush with top surface 111. In other embodiments, first end portion 221 could be flattened along top surface 250 of elongated member 201 so that first end portion 221 is approximately flush with top surface 111 of sole structure 110.

Figure 10:
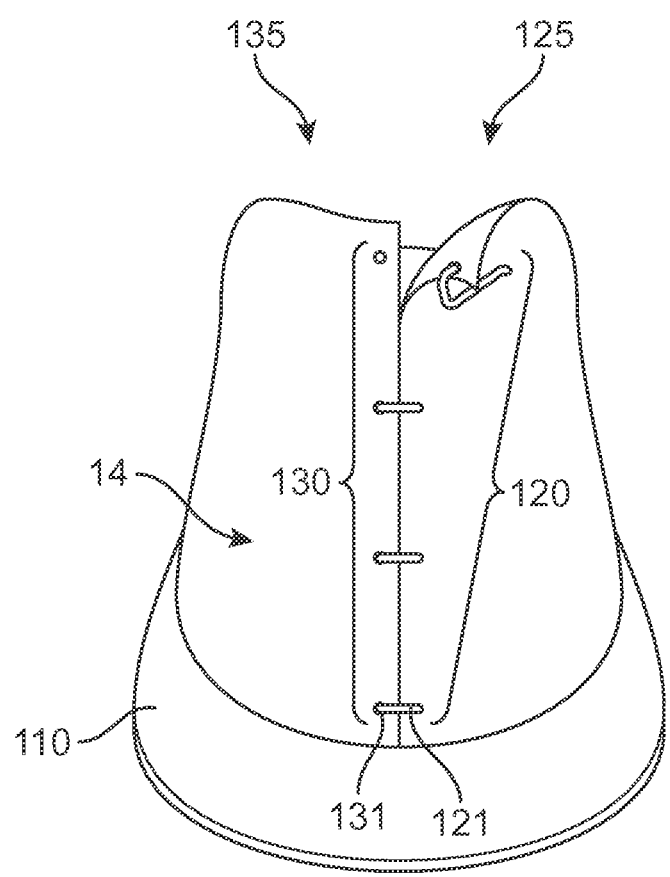

FIG. 10 shows upper 102 with first end 125 of heel portion 14 attached to second end 135 of heel portion 14 by passing heel straps 120 through apertures 130. For example, first heel strap 121 first passes through first aperture 131 to help secure first end 125 to second end 135.

Figure 11:
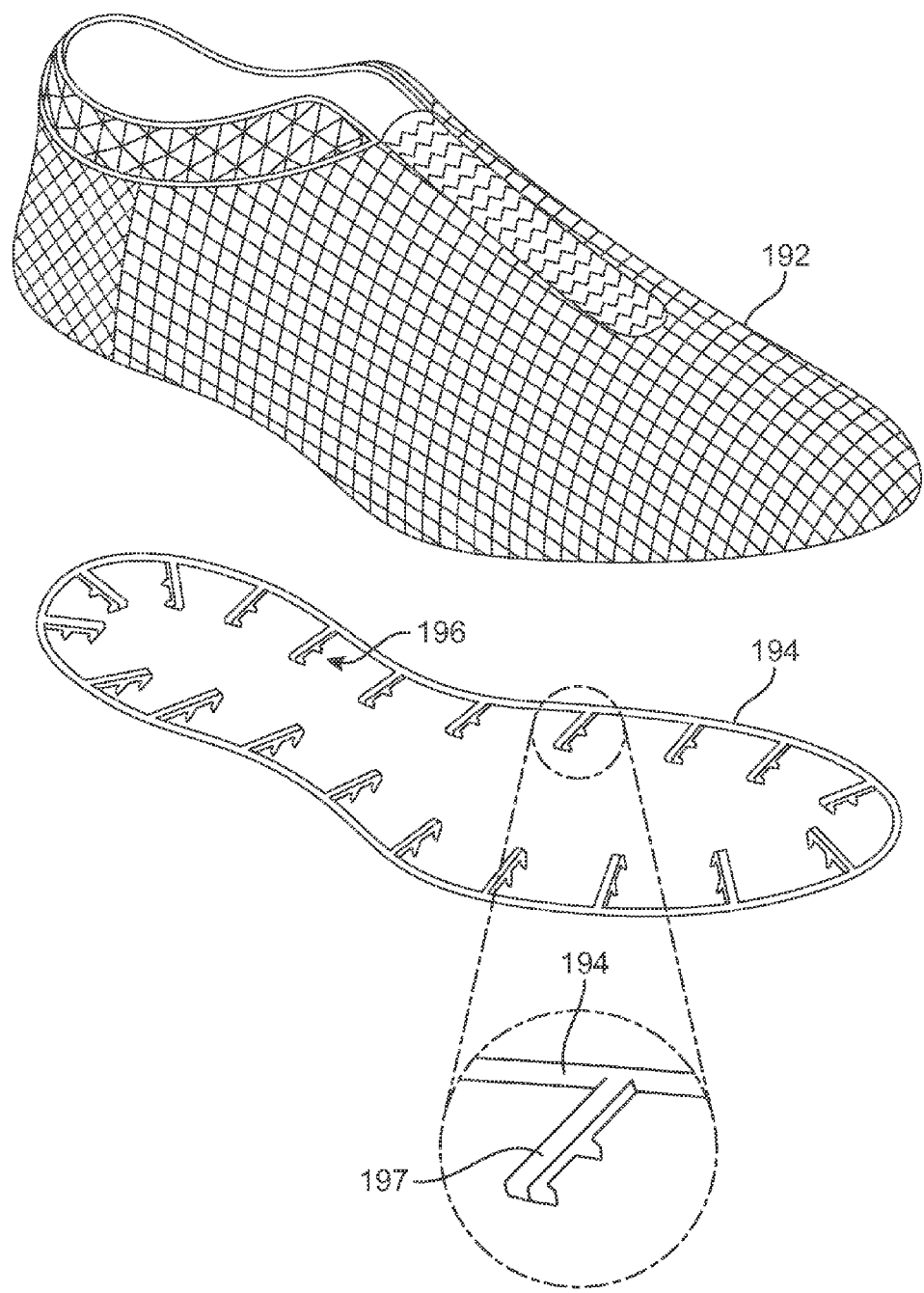
FIG. 11 is an exploded isometric view of an embodiment of an upper and a cord element with integrally formed elongated members.

FIG. 11 illustrates an isometric exploded view of another embodiment of an article having an upper 192 coupled to a cord element 194 and elongated members 196. FIG. 11 further includes an enlarged view of one elongated member 197 and a portion of cord element 194. For purposes of illustration, a corresponding sole structure is not shown in FIG. 11. In some embodiments, the corresponding sole structure may be similar in some or all respects to sole structure 110 discussed above and shown in FIGS. 6-9.

In the embodiment of FIG. 11, cord element 194 and elongated members 196 may be integrally formed, rather than having elongated members 196 separately formed and coupled to cord element 194. For example, an elongated member 197 is seen to be integrally formed with cord element 194. Cord element 194 could be further assembled with upper 192 in a manner that allows cord element 194 to at least partially rotate or twist with respect to upper 192. In some cases, for example, cord element 194 could be attached to upper 192 using various kinds of fasteners that allow for relative movement of cord element 194 and upper 192. In one embodiment, for example, cord element 194 could be attached to upper 192 using clips or bands. Such a configuration might therefore allow for relative movement of elongated members 196 and upper 192, which facilitates the assembly of elongated members 196 with a corresponding sole structure. For example, upper 192 with cord element 194 and elongated members 196 may be assembled with a corresponding sole structure in a substantially similar manner to the assembly of upper 102 with sole structure 110 shown in FIGS. 7-10.

The method described in FIGS. 7-10 offer several advantages over other possible attachment means (for example, sewing or gluing) of an upper to a sole structure. First, elongated members 200 are "non-destructively removable" from sole structure 110 of article of footwear 100. In other words, elongated members 200 may be removed from sole structure 110 without destroying, tearing, and/or breaking either upper 102 and/or sole structure 110. This allows components of article of footwear 100 to be interchangeable. For example, upper 102 may be connected to a new sole structure (not shown) which may replace sole structure 110 that becomes damaged. Or, the new sole structure may offer a different comfort or feel. Alternatively, sole structure 110 can be attached to a new upper providing a different comfort, feel, and/or aesthetic appeal. Further, using elongated member 200 may decrease the number of distinct materials used to manufacture article 100 in contrast to embodiments that require thread, glue or other adhesives, thereby reducing manufacturing costs.

The design of elongated members 200 offers further advantages. For example, angle 800 (see FIG. 5) between first notch 225 and bottom surface 240 of second end portion 222 may be selected according to the optimal configuration for securing elongated members 200 within recesses 300. In other words, first protrusion 225 and second protrusion 226, coupled with first notch 325 and second notch 326, offer a mechanical configuration sufficient to maintain attachment between upper 102 and sole structure 110.

Generally, elongated members 200 are not disconnected from recesses 300 unless a wearer manually (and intentionally) disconnects elongated members 200 from recesses 300. When a foot and/or liner is disposed within article 100, elongated members 200 may be prevented from disconnecting with recesses 300 as the foot and/or liner tends to restrict any vertical movement necessary for removal. Moreover, the protrusions of elongated members 200 (e.g., first protrusion 225 and second protrusion 226) when engaged with notches (e.g., first notch 325 and second notch 326) act to restrict horizontal motion of elongated members 200. In particular, as upper 102 pulls or tugs on elongated members 200 in a direction towards outer peripheral portion 116 of sole structure 110, the protrusions help prevent elongated members 200 from being pulled out of corresponding recesses 300.

In order to offer additional comfort, in some embodiments an insole and/or other liner (not shown) may be inserted over top surface 111 of sole structure after elongated members 200 engage recesses 300.

Figure 12:
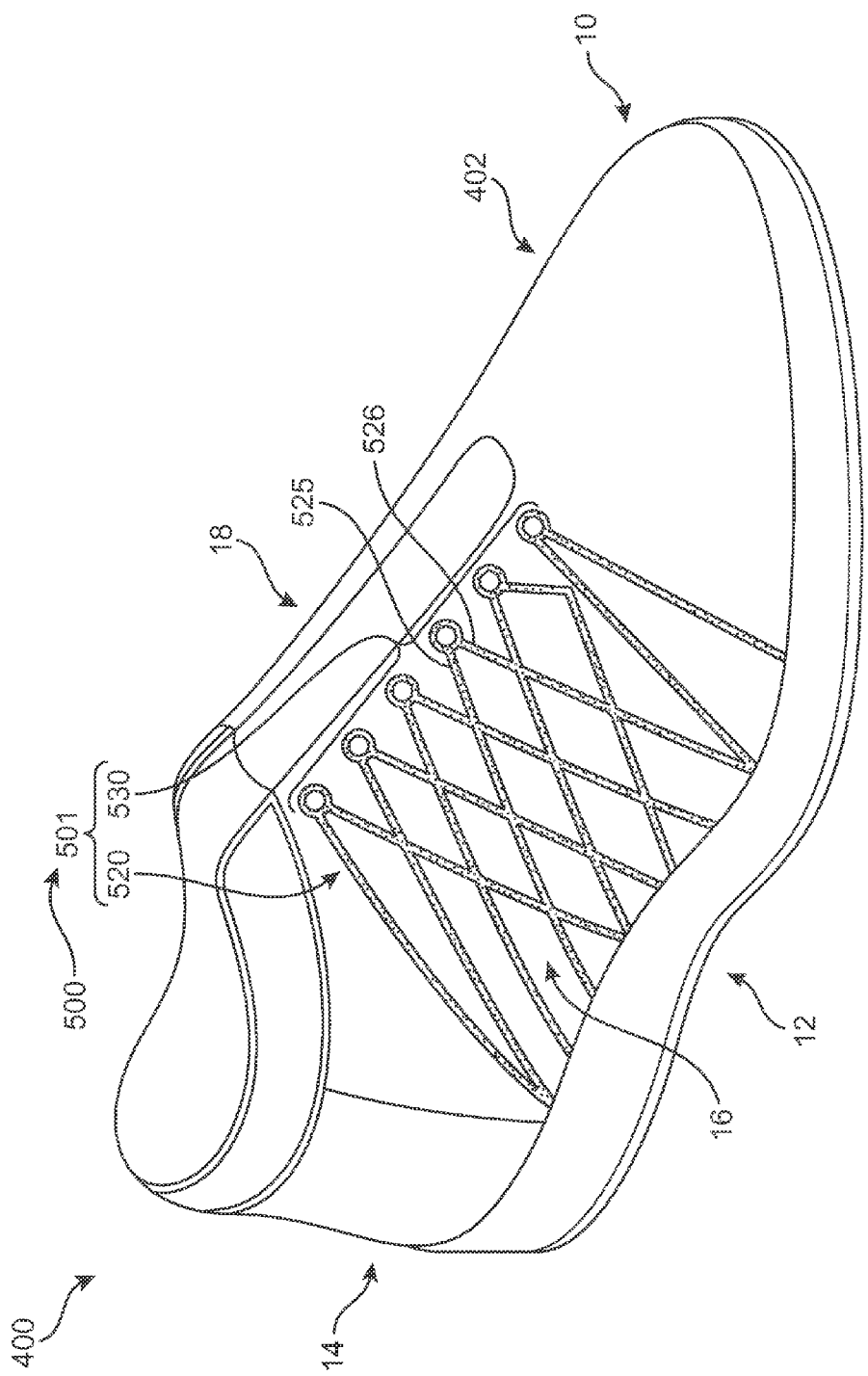
FIG. 12 an isometric side view of an another embodiment of an article of footwear having alternate elongated members.

In another embodiment, an article of footwear may include an upper made from a material, such as a textile material or leather material, with the upper having structures printed onto the upper by a three-dimensional printer. For example, in FIG. 12, upper 402 of article of footwear 400 (also referred to as simply article 400) includes several printed structures 500 printed on the lateral side 16 of upper 402 as well as the medial side (not shown) of upper 402. Printed structures 500 include a first printed structure 501 on lateral side 16 of article 500. First printed structure 501 includes extended portions 520 and fastener receiving portions 530. As shown in FIG. 12, extended portions 520 generally extend vertically along upper 402. For example, extended portions 520 include first extended portion 525 and second extended portion 526. In other embodiments, extended portions 520 may extend in a non-linear manner, such as a wavy-pattern or a zig-zag pattern. Further, extended portions 520 may be at least partially embedded in upper 402 with the embedded portion bonding to individual fibers (not shown) in upper 402. The embedded portion of extended portions 520 extends below the exterior surface of upper 402, while the remaining non-embedded portion of extended portions 520 extends above the exterior surface of upper 402. Moreover, extended portions 520 are generally anchored into upper 402 and free from movement. Although extended portions 520, as shown in FIG. 12, extend generally along midfoot portion 12 of article 400, extended portions 520 may also extend along forefoot portion 10 and/or heel portion 14.

Fastener receiving portions 530 are generally configured to receive a lacing system (not shown), such as shoe laces. As shown in FIG. 12, fastener receiving portions 530 may be looped structures. In some embodiments, fastener receiving portions 530 are at least partially embedded in upper 402 with the embedded portion bonding to individual fibers (not shown) in upper 402. In the embodiment shown in FIG. 12, fastener receiving portions 530 are not bonded to upper 402 and are free to move with a lacing system. In other words, fastener receiving portions 530 may be separated from upper 402. Although not shown, article of footwear 400 includes printed structures 500 having a second printed structure on the medial side 18 of article 400. The second printed structure may vary in any way described for the first printed structure 501.

Figure 13:
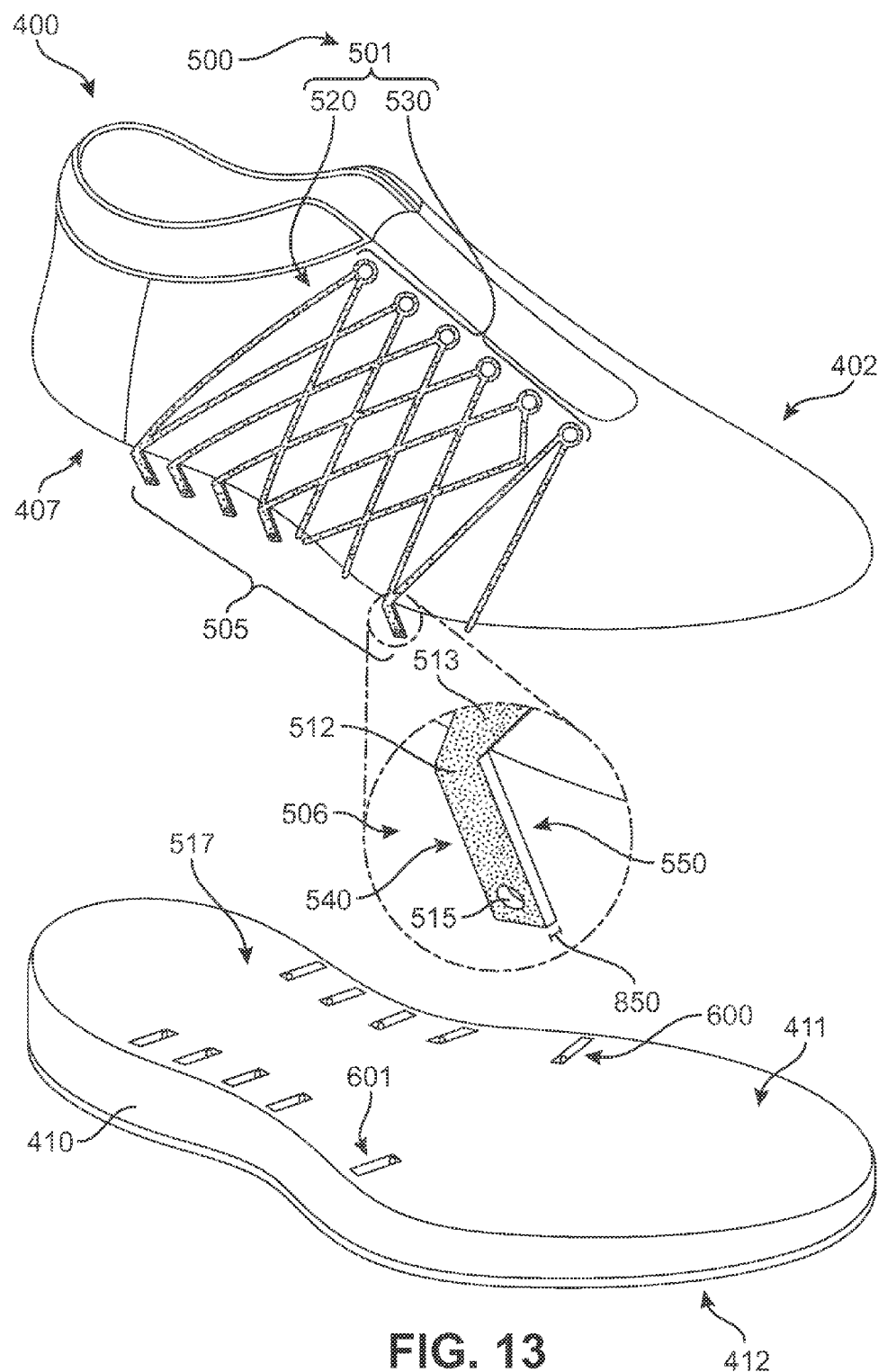
FIG. 13 is an exploded isometric view of the embodiment in FIG. 12, showing the upper, elongated members, and a sole structure.
Figure 14:
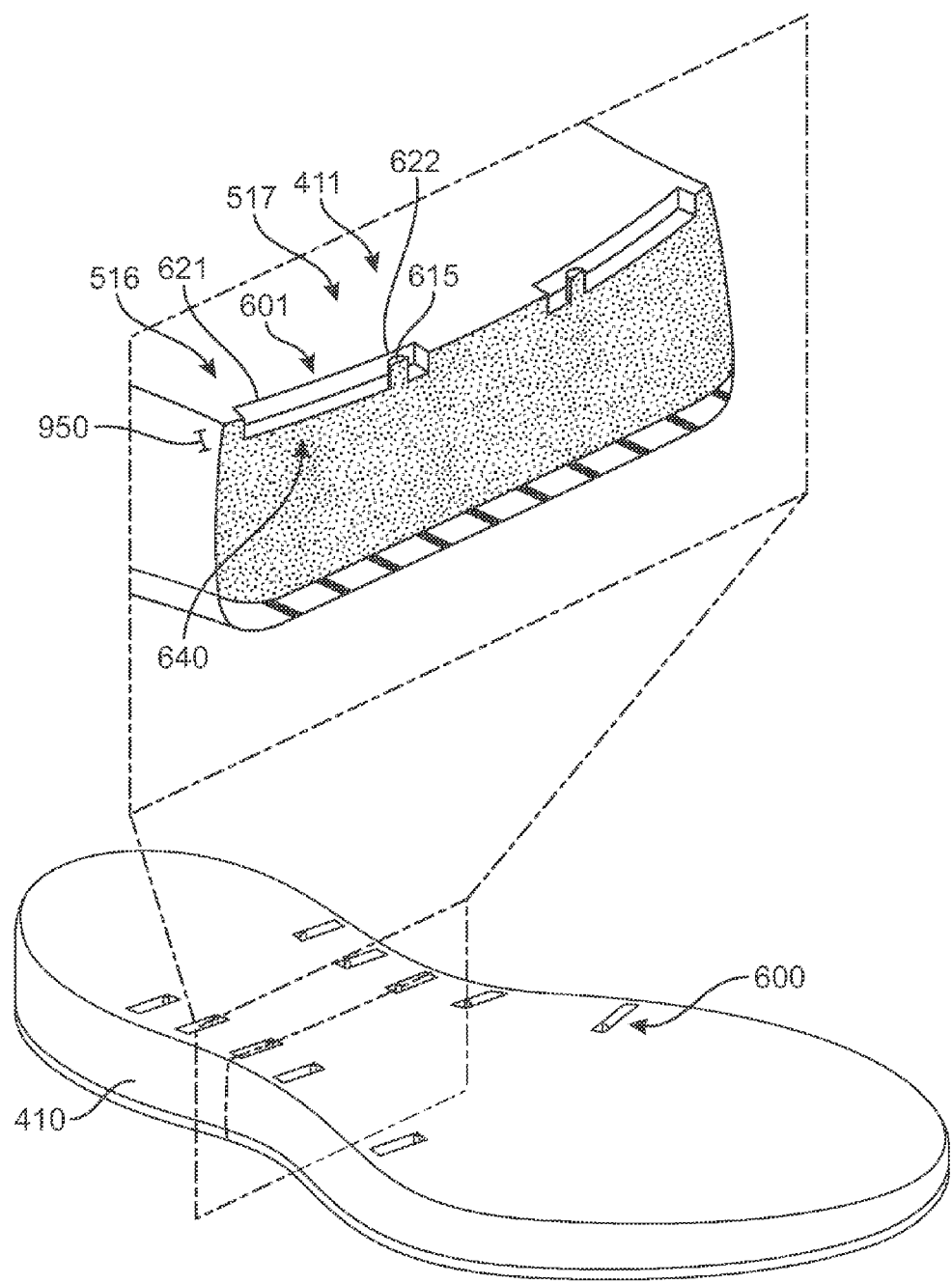
FIG. 14 is an isometric view of the sole structure in FIG. 13, with a cross sectional view of the sole structure.

FIGS. 13-14 illustrate another embodiment of elongated members used to secure or fasten an upper to a sole structure. As shown in FIG. 13, printed structures 500 further include several elongated members 505 extending from the lower peripheral portion 407 of upper 402. Elongated members 505 are printed from a printable material that could vary in any manner as previously described in the earlier embodiment. Generally, elongated members 505 are flexible and can bend and/or twist without tearing and/or breaking. Although elongated members 505 in FIG. 13 are generally shown on lateral side 16 of upper 402, elongated members may also be located on forefoot portion 10 and/or heel portion 14.

FIG. 13 further shows elongated members 505 having apertures. For example, first elongated member 506 includes first aperture 515. In some embodiments, first aperture 515 may be square or rectangular. In the embodiment shown in FIG. 13, first aperture 515 is generally circular. Also, in other embodiments, first elongated member 506 may further include a second aperture. Still, in other embodiments, first elongated member may further include at least three apertures. First elongated member 506 further includes exterior surface 540 and interior surface 550 on a surface opposite exterior surface 540. Further, first elongated member 506 includes a thickness 850, where thickness 850 extends from exterior surface 540 to interior surface 550. Thickness 850 may vary in the range of approximately 0.2 mm to 9 mm.

Also, FIGS. 13-14 illustrate sole structure 410 configured to attach to upper 402. Sole structure 410 includes top surface 411 having recesses 600. Sole structure 410 further includes bottom surface 412 disposed opposite of top surface 411. Bottom surface 412 is generally intended to contact a ground surface (not shown).

Recesses 600 are disposed on top surface 411, and are configured to receive elongated members 505. For example, first recess 601 of recesses 600 may be configured to receive first elongated member 506. Referring to FIG. 14, recesses 600 include at least one protrusion. For example, first recess 601 includes first protrusion 615.

Recesses 600 may be further arranged such that a first end of each recess is disposed in an outer peripheral portion of top surface 411, while a second end of each recess is disposed in an interior portion of top surface 411. For example, as shown in FIG. 14, first recess 601 has a first end portion 621 disposed in outer peripheral portion 516 of top surface 411. First recess 601 also has second end portion 622 disposed in interior portion 517 of top surface 411.

In order to secure upper 402 to sole structure 410, elongated members 505 are configured to bend inward toward interior portion 517 of top surface 411 of sole structure 410. For example, first elongated member 506 may bend with respect to an extended portion 513 at bending portion 512. Then, recesses 600 engage elongated members 505. For example, as shown in FIGS. 13 and 14, first protrusion 615 is configured to engage first aperture 515 of first elongated member 506. First protrusion 615, as shown in FIG. 14, is generally cylindrical. However, in other embodiments, first protrusion 615 may have a square or rectangular cross section. Generally, first protrusion 615 has a cross section that is substantially similar in size and shape to aperture 515 of first elongated member 506. Also, in other embodiments, first recess 601 may further include a second protrusion. Still, in other embodiments, first recess 601 may further include at least three protrusions. Although the number of protrusions may vary, the number of protrusions in first recess 601 may generally be similar to the number of apertures on first elongated member 506.

Referring again to FIG. 14, first recess 601 includes first depth 950. First depth 950 extends from bottom surface 640 of first recess 601 to top surface 411 of sole structure 410. Although first depth 950 may vary, first depth 950 is generally at least as large as thickness 850 of first elongated member 506. In some embodiments, first depth 950 is substantially similar to thickness 850. For example, in the embodiment shown in FIG. 13, thickness 850 is generally similar to first depth 950, and accordingly, when exterior surface 540 of first elongated member 506 engages bottom surface 640 of first recess 601, interior surface 550 of first elongated member 506 may be generally co-planar, or flush, with top surface 411 of sole structure 410. In other embodiments, interior surface 550 of first elongated member 506 may not be co-planar with top surface 411 of sole structure 410. For example, thickness 850 could be greater than first depth 950 so that interior surface 550 of first elongated member 506 is elevated with respect to top surface 411 of sole structure 410. Alternatively, first depth 950 could be greater than thickness 850 so that top surface 411 of sole structure 410 is elevated with respect to interior surface 550 of first elongated member 506.

In some embodiments, some of the components comprising the articles described above and shown in FIGS. 1-14 may be formed using a three-dimensional printer. However, in other embodiments, these structures could be manufactured by means other than a three-dimensional printer. For example, other embodiments could use injection molding. Further, attachment means (of elongated members to an upper) could include ultrasonic welding or radio frequency welding in order to create an upper having attached portions and fastener receiving portions.

Figure 15:
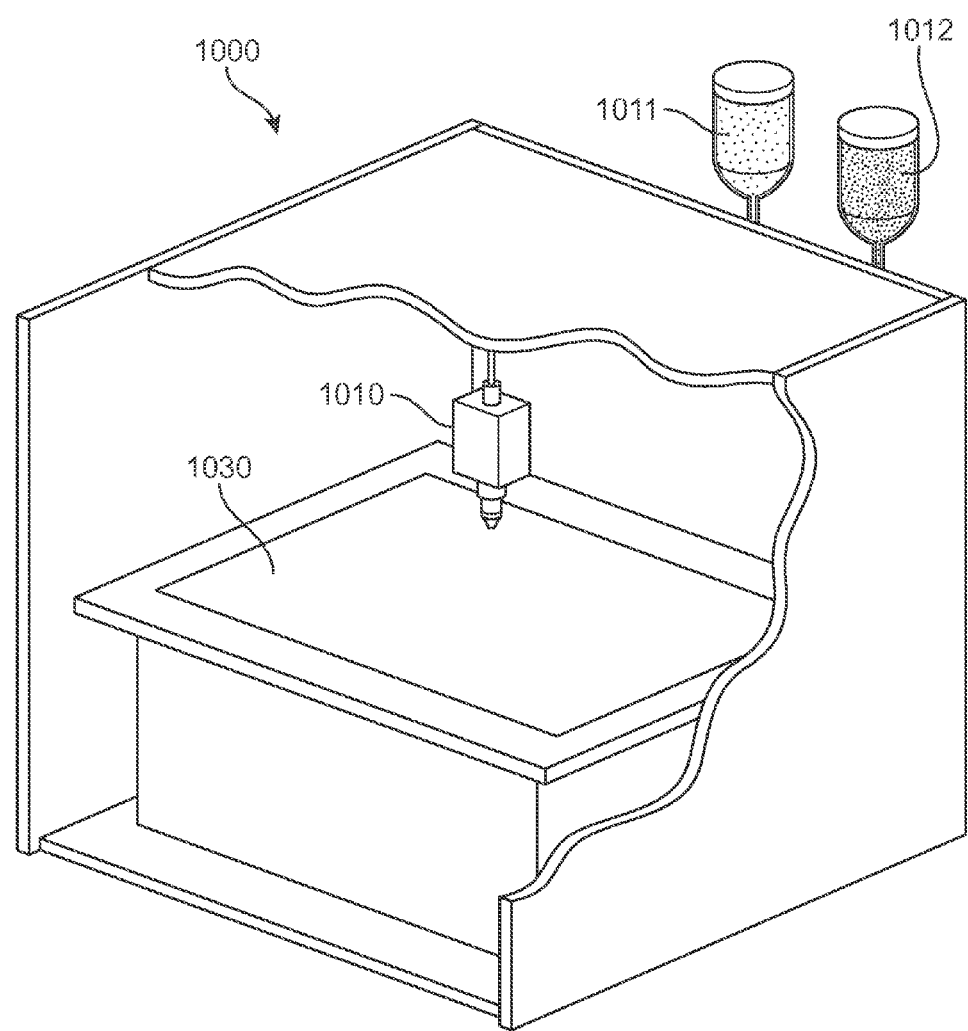
FIG. 15 is a schematic view of an embodiment of a three-dimensional printer.

FIG. 15 illustrates three-dimensional printer 1000. Three-dimensional printer 1000 could be, for example, a Maker-Bot® Replicator™ 2. Three-dimensional printer 1000 is connected to a power source (not shown) in order to supply a current to three-dimensional printer 1000. Three-dimensional printer 1000 further includes print head 1010 capable of moving in three dimensions and disposing a printable material to form a three-dimensional object, including an upper or other portions of an article. In the embodiment shown in FIG. 15, print head 1010 is capable of delivering first printable material 1011 and second printable material 1012 onto a surface 1030 of three-dimensional printer 1000 in order to form portions of an article. In other embodiments, a first print head and a separate second print head are used to dispose a first print substance 1011 and a second print substance 1012, respectively, onto surface 1030.

Figure 16:
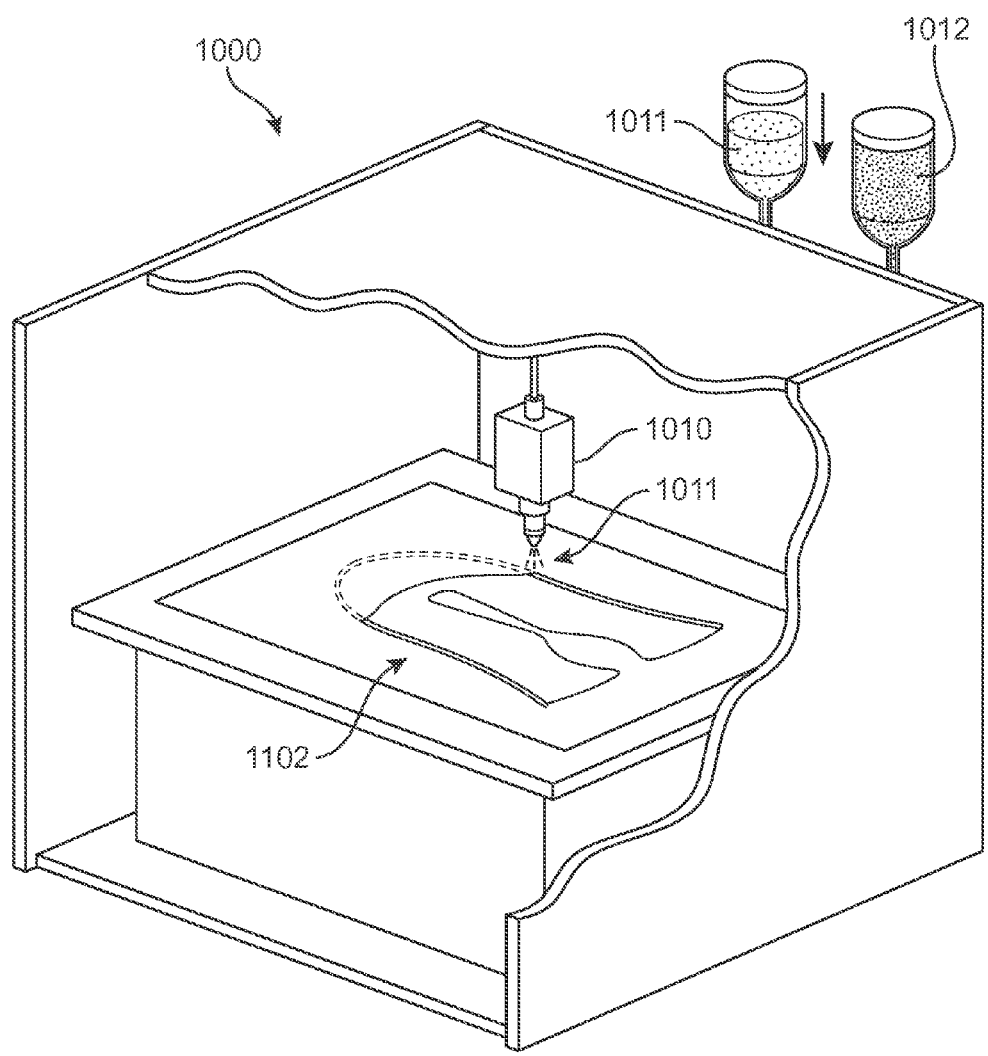
FIG. 16-17 are schematic views of steps in a method of printing an upper, and printing elongated members onto the upper, according to an embodiment.
Figure 17:
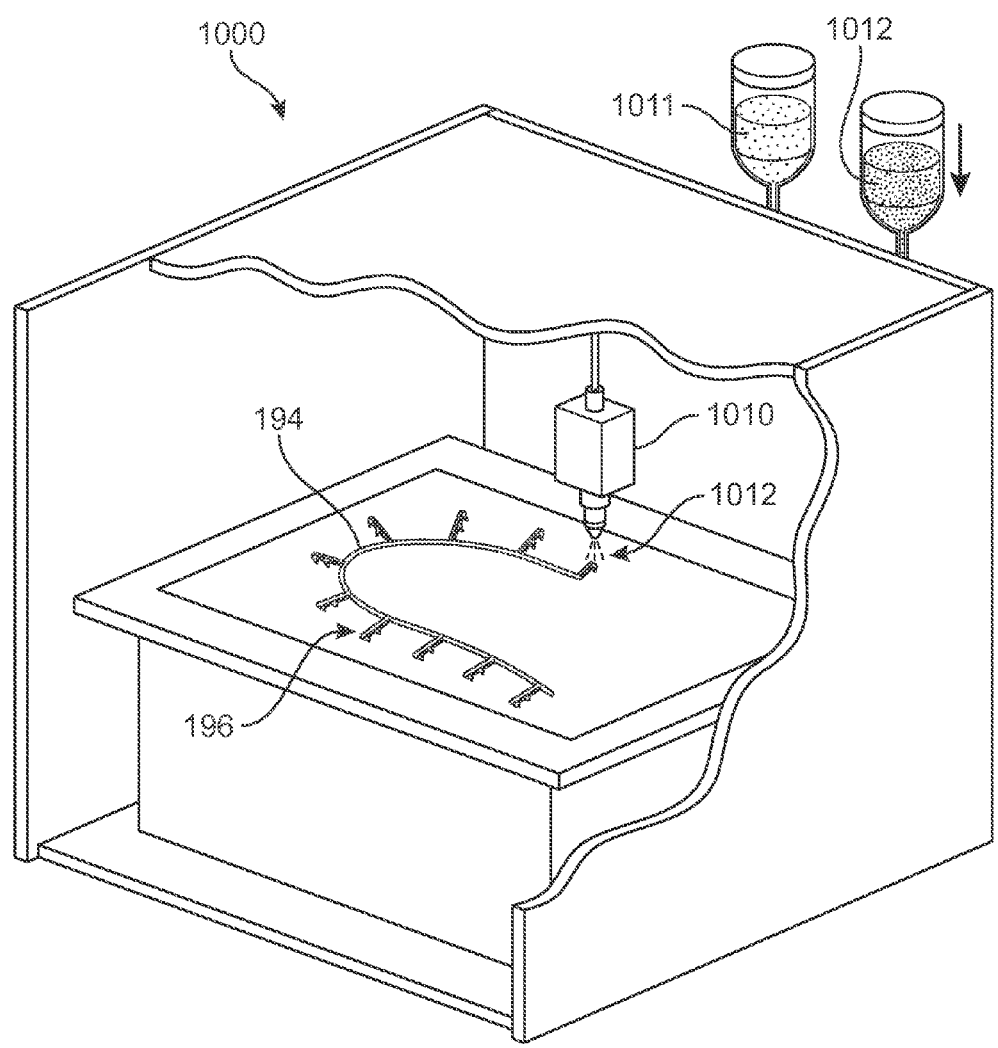
Figure 18:
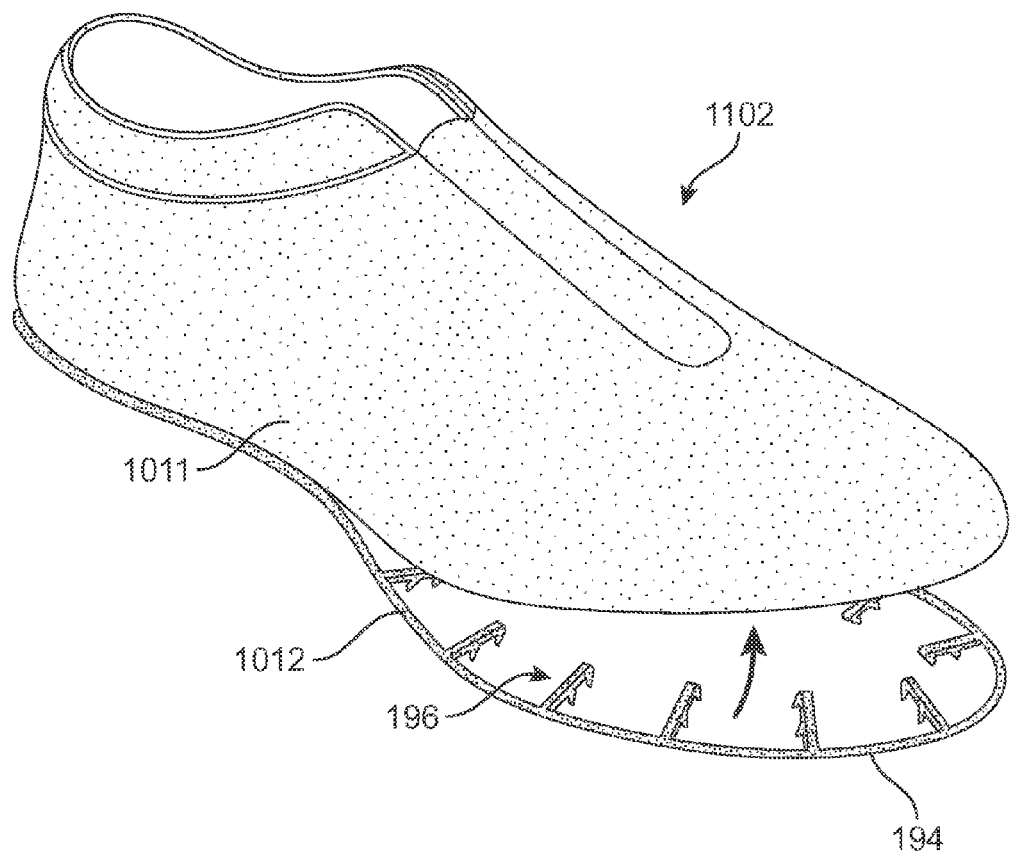
FIG. 18 is an isometric view of the upper and elongated members shown in FIGS. 15-17, according to an embodiment.

FIGS. 16-18 illustrate upper 102 and elongated members 200 being printed in three-dimensional printer 1000. Three-dimensional printer 1000 is capable of printing multiple printable materials of varying densities and strengths. For example, first printable material 1011 could have a first density and first tensile strength, and second printable material 1012 could have a second density and second tensile strength. In some embodiments, first printable material 1011 has a higher density and higher tensile strength than second printable material 1012. In the embodiment shown in FIGS. 16-18, second printable material 1012 has a higher density and higher tensile strength than first printable material 1011. It should be understood a more dense printable material or a printable material having a higher tensile strength may create a more rigid structure made to additionally resist tearing, breaking, bending, and/or deforming. As used herein, the density of first printable material 1011 and second printable material 1012 refer to densities of these materials in a cured state.

FIG. 16 shows a portion of upper 1102 printed in three-dimensional printer 1000. Three-dimensional printer 1000 uses first printable material 1011 to print upper 1102. In other embodiments, upper 1102 is made from second printable material 1012. Still, in other embodiments, upper 1102 could be made from a combination of first printable material 1011 and second printable material 1012.

As shown in FIG. 17, a cord element 194 with integrally formed elongated members 196 may be printed using three-dimensional printer 1000. As shown in FIG. 17, in some embodiments, cord element 194 and elongated members 196 are printed with second printable material 1012. In some other embodiments, cord element 194 and elongated members 196 are printed with first printable material 1011. Still, in other embodiments, cord element 194 and elongated members 196 could be printed with a combination of first printable material 1011 and second printable material 1012.

In FIG. 18, cord element 194 with integrally formed elongated members 196 may be coupled with upper 1102. This coupling may be achieved using any means known in the art, and in at least some cases may be selected so that cord element 194 and elongated members 196 can move related to upper 1102 (e.g., via rotation or twisting).

As indicated schematically in FIG. 18, upper 1102 is formed from first printable material 1011, while cord element 194 and elongated members 196 are formed from second printable material 1012. As discussed above, in at least some embodiments, first printable material 1011, when cured, may be less rigid than second printable material 1012. This configuration may allow for upper 1102 to stretch and flex around a foot, while cord 194 and elongated members 196 may generally resist stretching in order to maintain a strong connection with a corresponding sole structure.

Several other possible configurations for coupling elongated members and an upper, during or after printing of these components are possible. In one embodiment, elongated members with apertures for receiving a cord could be printed separately from the cord and the upper, and at a later time coupled to the cord (e.g., by inserting the cord through the apertures of the elongated members). Then, the cord and elongated members could be further assembled with the printed upper.

It is contemplated that in at least one embodiment, the process of printing may include separately printing an upper, a cord and elongated members. Then, after printing each component separately, the elongated members could be coupled to the cord (e.g., by passing the cord through apertures of the elongated members). The assembled cord and elongated members could then be further coupled to the upper. Optionally, a cord may not be printed, but could be assembled with elongated members and/or an upper after the upper and elongated members have been separately printed.

As already discussed, elongated members may be configured as mechanical connectors in at least some embodiments. In particular, elongated members may also be referred to as mechanical connectors when the elongated members have provisions for engaging recesses in a sole structure.

Figure 19:
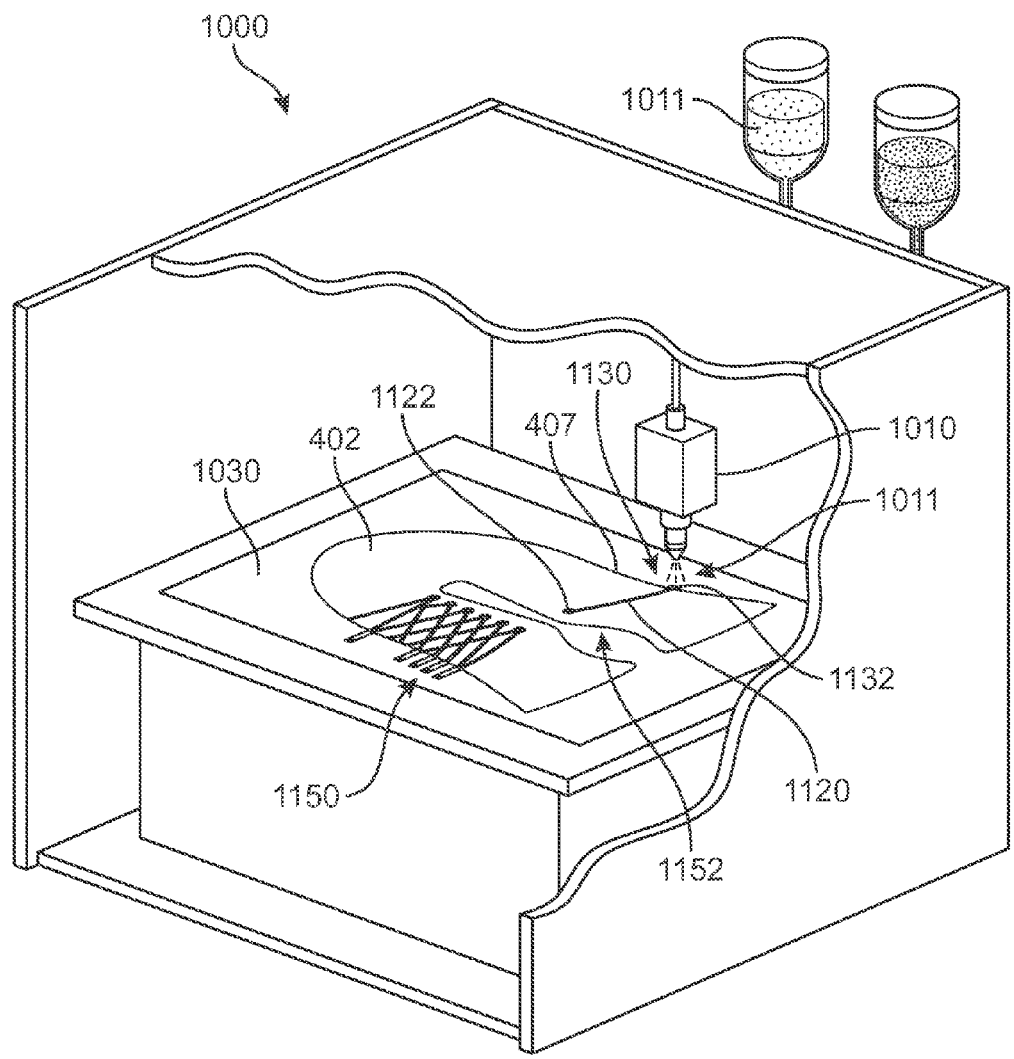
FIGS. 19-20 are schematic views of steps in a method of printing mechanical connectors onto an upper, according to an embodiment.
Figure 20:
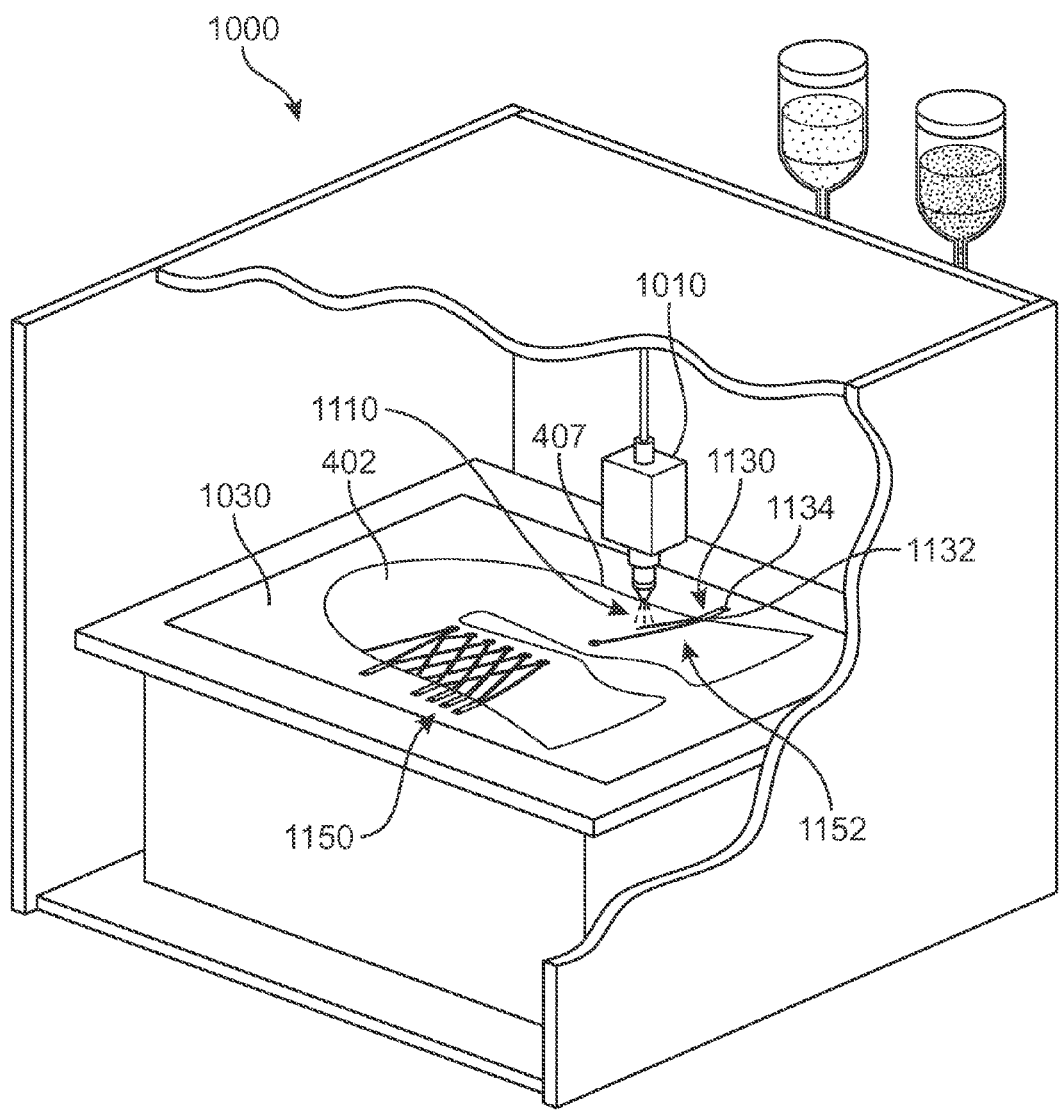

FIGS. 19 and 20 illustrate an embodiment of a method of forming the upper and elongated members for article of footwear 400 using three-dimensional printer 1000, which is discussed above and shown in FIGS. 12-14. As shown in FIG. 19, upper 402 may be associated with surface 1030 during a first step. Optionally, in some cases, upper 402 could be printed using three-dimensional printer 1000 prior to the step shown in FIG. 15. However, in other cases, upper 402 could be manufactured from a textile or other material known in the art for making uppers.

With upper 402 in place, three-dimensional printer 1000 may begin printing a printable material 1011 onto upper 402. In FIG. 19, print head 1010 has already printed a first printed structure 1150 on one side of upper 402. In the embodiment of FIG. 19, print head 1010 prints an extended portion 1120 and a fastener receiving portion 1122. In addition, print head 1010 prints a first end portion 1132 of an elongated member 1130 directly onto lower peripheral portion 407 of upper 402. Elongated member 1130 may be configured to engage a recess in a sole structure, and therefore elongated member 1130 may be a mechanical connector.

Next, as shown in FIG. 20, print head 1010 continues printing a second end portion 1134 of elongated member 1130. Here, second end portion 1134 is printed in a manner such that second end portion 1134 is connected to first end portion 1132, but second end portion 1134 is not directly connected to lower peripheral portion 407. Instead, second end portion 1134 extends away from lower peripheral portion 407. In at least some embodiments, elongated member 1130 is printed to have an aperture that can engage a protrusion in a corresponding recess on a sole structure, as discussed previously and shown in FIGS. 13 and 14.

Following this, print head 1010 may continue to print additional extended portions, fastener receiving portions and elongated members of a second printed structure 1152. As discussed above, each elongated member may be a mechanical connector. For example, elongated member 1130 is a mechanical connector that is configured to connect to an associated sole structure (e.g., sole structure 410 of FIG. 13). Moreover, the printed mechanical connectors, which have been printed directly to upper 402, may engage recesses 600 in sole structure 410 to facilitate assembly of article of footwear 400 (see FIG. 13).

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. An article of footwear, comprising:
an upper having a lower peripheral portion, wherein the upper includes an elongated member extending from the lower peripheral portion;
a sole structure having a top surface and an opposing bottom surface, wherein the top surface is disposed closer to the upper than is the bottom surface;
the sole structure including a recess disposed in the top surface and extending below the top surface toward the bottom surface;
the top surface of the sole structure further including an interior portion, and also including an outer peripheral portion disposed outwardly of the interior portion;
wherein the recess includes a first end portion disposed on the outer peripheral portion of the top surface, and a second end portion disposed on the interior portion of the top surface;
wherein the elongated member includes a first end portion and a second end portion;
wherein the first end portion of the elongated member engages the first end portion of the recess and the second end portion of the elongated member engages the second end portion of the recess; and
wherein the upper includes a cord element coupled with and extending along the lower peripheral portion of the upper, and wherein the elongated member is attached to the cord element.

2. The article of footwear according to claim 1, wherein the elongated member includes an aperture and wherein the cord element is disposed through the aperture of the elongated member.

3. The article of footwear according to claim 1, wherein:
the second end portion of the elongated member includes each of a first protrusion and a second protrusion;
wherein the second end portion of the recess includes each of a first notch and a second notch;
wherein the first protrusion engages the first notch; and
wherein the second protrusion engages the second notch.

4. The article of footwear according to claim 3, wherein the second end portion of the elongated member includes at least a third protrusion, and wherein the second end portion of the recess includes at least a third notch.

5. The article of footwear according to claim 3, wherein the second end portion of the elongated member comprises a top surface, and wherein the top surface of the second end portion is co-planar with the top surface of sole structure when the elongated member is engaged with the recess.

6. The article of footwear according to claim 1, wherein the upper further comprises at least one mesh portion.

7. The article of footwear according to claim 6, wherein the mesh portion is formed of a cured polymeric material suitable for dispensing from a three-dimensional printer when in an uncured state.

8. The article of footwear according to claim 1, wherein the elongated member is formed of a cured polymeric material suitable for dispensing from a three-dimensional printer when in an uncured state.

9. An article of footwear, comprising:
an upper having a lower peripheral portion, wherein the upper includes an elongated member extending from the lower peripheral portion;
a sole structure having a top surface and an opposing bottom surface, wherein the top surface is disposed closer to the upper than is the bottom surface;
the sole structure including a recess disposed in the top surface;
the top surface of the sole structure further including an interior portion, and also including an outer peripheral portion disposed outwardly of the interior portion;
wherein the recess includes a first end portion associated with the outer peripheral portion of the top surface, and the recess includes a second end portion associated with the interior portion of the top surface;
wherein the elongated member includes a first end portion, and the elongated member includes a second end portion;
wherein the first end portion of the elongated member engages the first end portion of the recess, and the second end portion of the elongated member engages the second end portion of the recess;
wherein the upper includes a cord element coupled with and extending along the lower peripheral portion of the upper, and wherein the elongated member is attached to the cord element.

10. The article of footwear according to claim 9, wherein the elongated member includes an aperture and the cord element is disposed through the aperture of the elongated member.

11. The article of footwear according to claim 9, wherein the second end portion of the elongated member includes each of a first protrusion and a second protrusion;
wherein the second end portion of the recess includes each of a first notch and a second notch;
wherein the first protrusion engages the first notch; and
wherein the second protrusion engages the second notch.

12. The article of footwear according to claim 11, wherein the second end portion of the elongated member includes at least a third protrusion, and the second end portion of the recess includes at least a third notch.

13. The article of footwear according to claim 11, wherein the second end portion of the elongated member comprises a top surface, and the top surface of the second end portion is co-planar with the top surface of sole structure when the elongated member is engaged with the recess.

14. The article of footwear according to claim 9, wherein the upper further comprises at least one mesh portion.

15. The article of footwear according to claim 14, wherein the mesh portion is formed of a cured polymeric material suitable for dispensing from a three-dimensional printer when in an uncured state.

16. The article of footwear according to claim 9, wherein the elongated member is formed of a cured polymeric material suitable for dispensing from a three-dimensional printer when in an uncured state.

17. An article of footwear, comprising:
an upper having a lower peripheral portion, wherein the upper includes an elongated member extending from the lower peripheral portion;
a sole structure having a top surface and an opposing bottom surface, wherein the top surface is disposed closer to the upper than is the bottom surface;
the sole structure including a recess disposed in the top surface;
the top surface of the sole structure further including an interior portion, and also including an outer peripheral portion disposed outwardly of the interior portion;
wherein:

the recess includes a first end portion associated with the outer peripheral portion of the top surface and a second end portion associated with the interior portion of the top surface;
the elongated member includes a first end portion and a second end portion;
the first end portion of the elongated member engages the first end portion of the recess and the second end portion of the elongated member engages the second end portion of the recess;
the second end portion of the elongated member includes each of a first protrusion and a second protrusion;
the second end portion of the recess includes each of a first notch and a second notch;
the first protrusion engages the first notch;
the second protrusion engages the second notch;
the second end portion of the elongated member comprises a top surface; and
the top surface of the second end portion is co-planar with the top surface of the sole structure when the elongated member is engaged with the recess.

* * * * *